(12) United States Patent
Jung et al.

(10) Patent No.: US 11,549,701 B2
(45) Date of Patent: Jan. 10, 2023

(54) HUMIDIFICATION AND AIR CLEANING APPARATUS

(71) Applicant: LG ELECTRONICS INC., Seoul (KR)

(72) Inventors: Jaehyuk Jung, Seoul (KR); Seungdeok Yang, Seoul (KR); Seokho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 17/113,270

(22) Filed: Dec. 7, 2020

(65) Prior Publication Data
US 2021/0172626 A1 Jun. 10, 2021

(30) Foreign Application Priority Data

Dec. 6, 2019 (KR) .......................... 10-2019-0161480

(51) Int. Cl.
| | | |
|---|---|---|
| *F24F 6/14* | (2006.01) | |
| *F24F 110/50* | (2018.01) | |
| *F24F 6/00* | (2006.01) | |

(52) U.S. Cl.
CPC .......... *F24F 6/14* (2013.01); *F24F 2006/008* (2013.01); *F24F 2110/50* (2018.01)

(58) Field of Classification Search
CPC .. F24F 6/14; F24F 2110/50; F24F 8/10; F24F 8/117; F24F 2006/008; F24F 13/20; F24F 6/06; F24F 2006/065; F24F 13/082; F24F 8/108; F24F 8/133; F24F 6/04; F24F 13/075; Y02A 50/20; Y02B 30/54; F04D 29/4226; F04D 17/06; F04D 25/08;
(Continued)

(56) References Cited

U.S. PATENT DOCUMENTS

| | | | | |
|---|---|---|---|---|
| 2,354,466 A | * | 7/1944 | Levinsen | ............... F24F 13/08 454/82 |
| 2015/0115481 A1 | * | 4/2015 | Jang | ......................... F24F 6/16 261/24 |

(Continued)

FOREIGN PATENT DOCUMENTS

| | | |
|---|---|---|
| CN | 102003784 | 4/2011 |
| CN | 203281176 | 11/2013 |

(Continued)

OTHER PUBLICATIONS

European Search Report dated May 11, 2021 issued in Application No. 20212068.9.
(Continued)

*Primary Examiner* — Stephen Hobson
(74) *Attorney, Agent, or Firm* — Ked & Associates

(57) ABSTRACT

A humidification and air cleaning apparatus is provided that may include a water tank having a discharge port which is open toward an upper side, and a discharge grill disposed at the water tank and covering the discharge port. The discharge grill may have a plurality of vanes disposed at the discharge port and spaced apart from each other, and when viewed from a top, overlap each other to cover the discharge port. An edge of a vane may overlap an edge of an adjacent vane, thereby minimizing scattering of droplets to an indoor space while minimizing resistance of discharged air.

19 Claims, 22 Drawing Sheets

(58) Field of Classification Search
CPC .... F04D 29/444; F04D 29/624; F04D 29/667; F04D 29/705; F05D 2240/12; F05D 2250/52
See application file for complete search history.

(56) References Cited

U.S. PATENT DOCUMENTS

2016/0201939 A1* 7/2016 Jonas ................ F24F 13/082
                                                           454/309
2017/0122587 A1* 5/2017 Son ................ B01F 23/2132
2018/0147523 A1   5/2018 Oh

FOREIGN PATENT DOCUMENTS

| CN | 106150790 | 11/2016 |
|---|---|---|
| CN | 107014021 | 8/2017 |
| CN | 209461253 | 10/2019 |
| EP | 3163191 | 5/2017 |
| KR | 10-2016-0012796 | 2/2016 |
| KR | 10-2016-0017587 | 2/2016 |
| KR | 10-2017-0051233 | 5/2017 |
| KR | 10-2018-0063725 | 6/2018 |
| WO | WO 2013/141549 | 9/2013 |

OTHER PUBLICATIONS

European Office Action dated Mar. 10, 2022 issued in Application No. 20212068.9.
Chinese Office Action dated Jan. 13, 2022 issued in Application No. 202011430928.5 (English translation attached).

* cited by examiner

FIG. 8
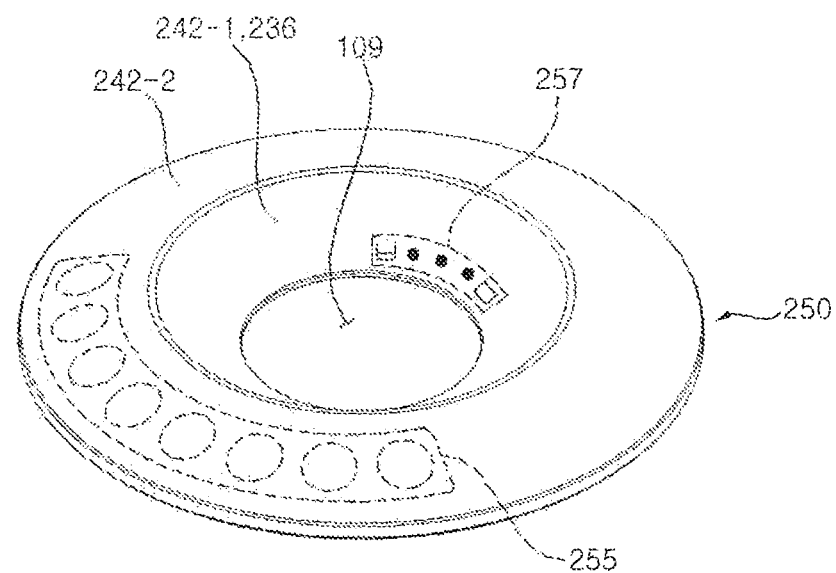
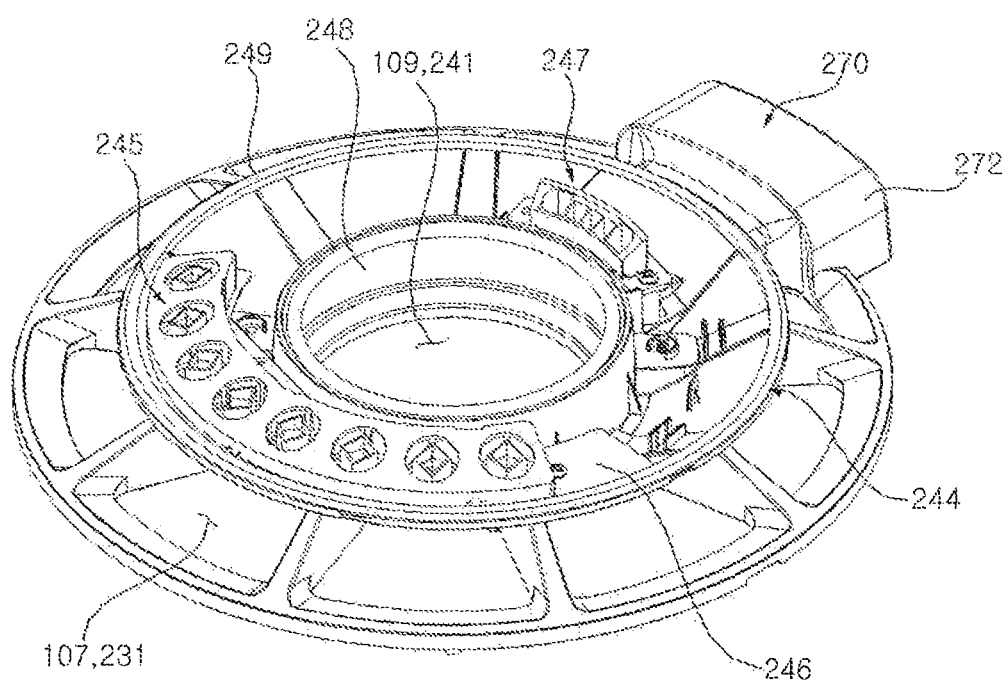

FIG. 9
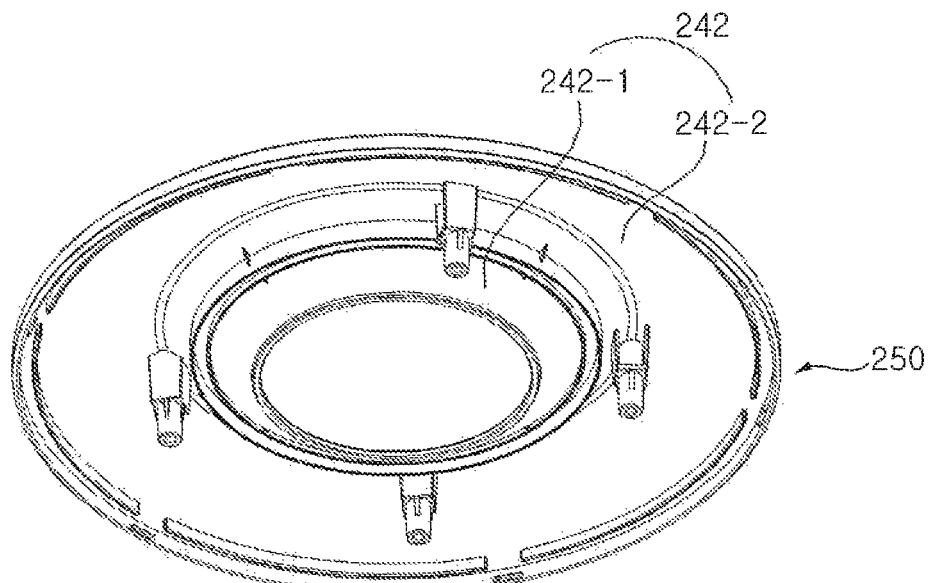
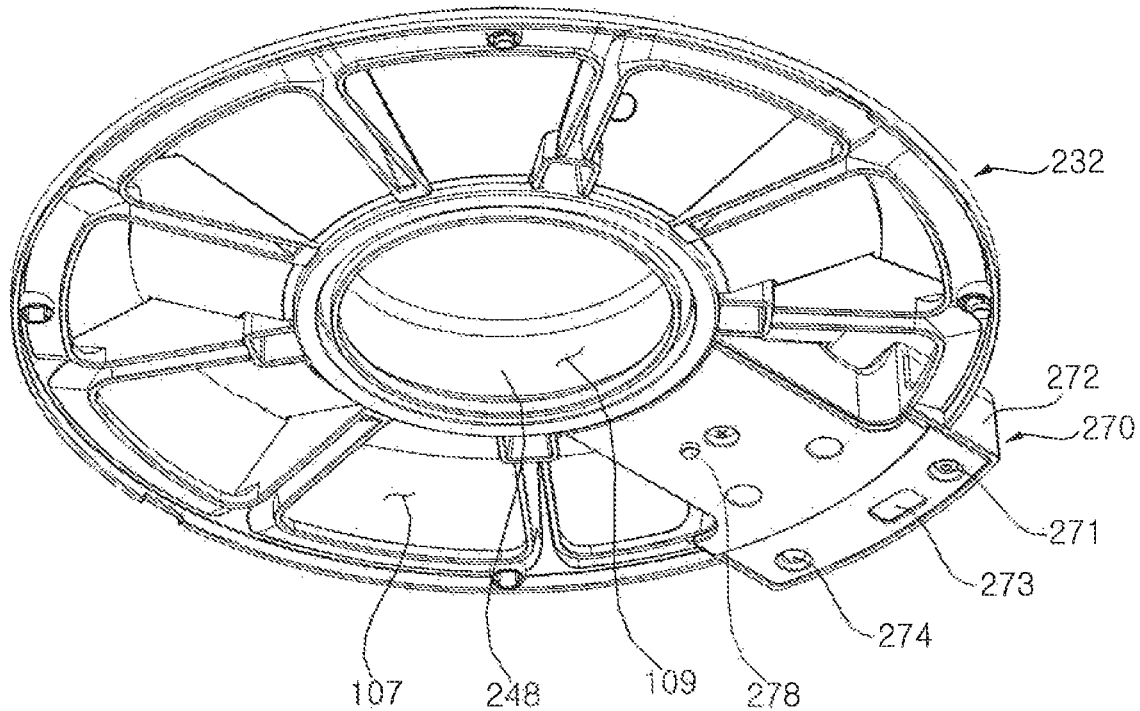

HUMIDIFICATION AND AIR CLEANING APPARATUS

CROSS-REFERENCE TO RELATED APPLICATION(S)

This application claims priority under 35 U.S.C. § 119 to Korean Application No. 10-2019-0161480 filed on Dec. 6, 2019, whose entire disclosure is hereby incorporated by reference.

BACKGROUND

1. Field

A humidification and air cleaning apparatus is disclosed herein.

2. Background

Air conditioning apparatuses include air conditioners that control a temperature of air, air cleaners that remove foreign substances from air to maintain air cleanliness, humidifiers that increase humidity in the air, and dehumidifiers that reduce humidity in the air. Typical humidifiers are classified into a vibration type, which atomizes water on a vibrating plate and discharges it into air, and a natural evaporation type which evaporates water in a humidification filter.

The natural evaporation type humidifier is classified into a disc type humidifier, which rotates a disc using a drive force and allows water to naturally evaporate from the surface of the disc in the air, and a humidification filter type humidifier which allows water to naturally evaporate from a wet humidification medium by flowing air.

Korean Laid-Open Patent Publication No. 10-2017-0051233 (hereinafter referred to as "related art document") discloses an apparatus for both humidification and air cleaning. The apparatus for both humidification and air cleaning disclosed in the related art document includes a discharge humidification medium which covers a discharge port to prevent droplets, scattered from a water tank, from being directly discharged through the discharge port at an upper side of the water tank. A general mesh type discharge humidification medium may prevent the droplets from being scattered to an indoor space, but has a problem in that the discharge humidification medium covers the entire discharge port, thereby causing resistance to the discharged air and reducing air volume.

BRIEF DESCRIPTION OF THE DRAWINGS

Embodiments will be described in detail with reference to the following drawings in which like reference numerals refer to like elements, and wherein:

FIG. 8 is an exploded perspective view of the top cover assembly of FIG. 5, from which an upper operation housing is separated;

FIG. 9 is a perspective view of FIG. 8 when viewed from the bottom;

DETAILED DESCRIPTION

Figure 1:
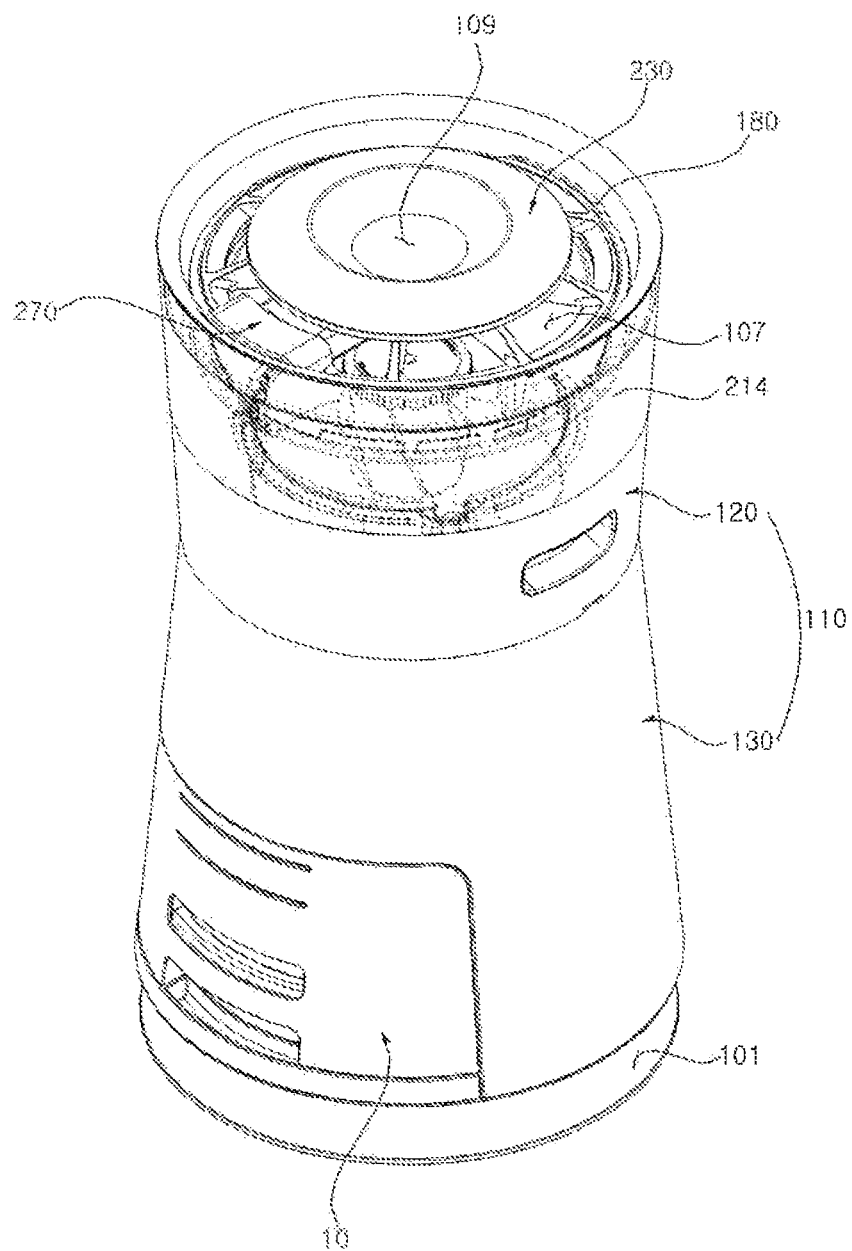
FIG. 1 is a perspective view of a humidification and air cleaning apparatus according to an embodiment.

Advantages and features of embodiments and methods of accomplishing the same will be more clearly understood from embodiments described below with reference to the accompanying drawings. However, the embodiments are not limited to the following embodiments but may be implemented in various different forms. The embodiments are provided only to complete disclosure and to fully provide a person having ordinary skill in the art to which embodiments pertains with a category, and embodiments will be defined by the scope of the appended claims. Wherever possible, like reference numerals generally denote like elements through the specification.

Hereinafter, embodiments will be described with reference to the accompanying drawings.

Figure 2:
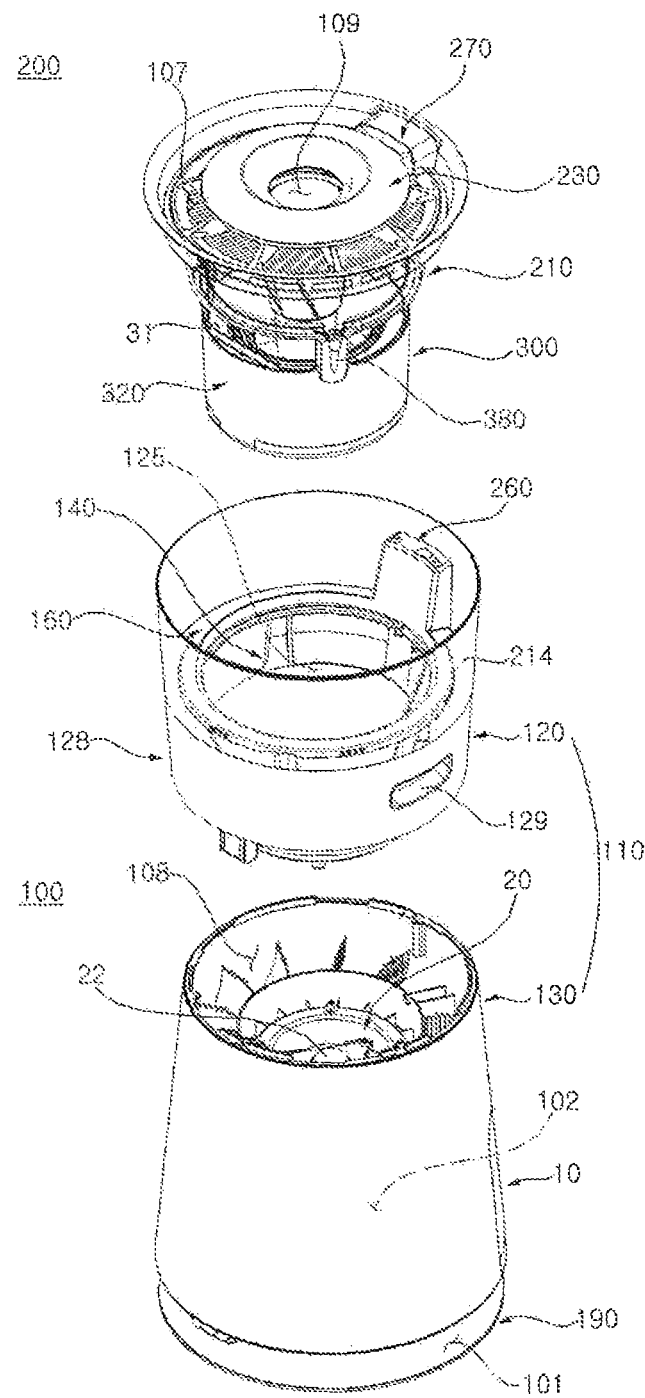
FIG. 2 is an exploded perspective view of the humidification and air cleaning apparatus of FIG. 1.
Figure 3:
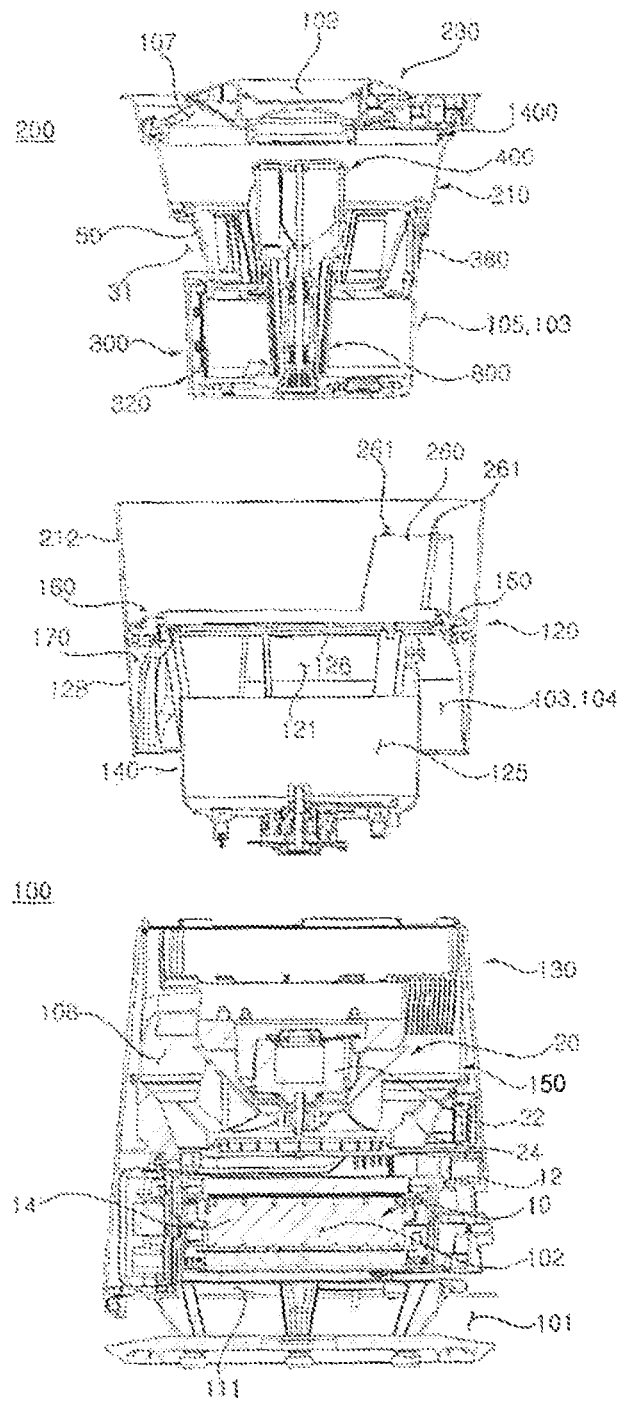
FIG. 3 is a front cross-sectional view of the humidification and air cleaning apparatus of FIG. 2.

FIG. 1 is a perspective view of a humidification and air cleaning apparatus according to an embodiment. FIG. 2 is an exploded perspective view of the humidification and air cleaning apparatus of FIG. 1. FIG. 3 is a front cross-sectional view of the humidification and air cleaning apparatus of FIG. 2.

Referring to FIGS. 1 to 3, a humidification and air cleaning apparatus according to this embodiment may include an air cleaning module 100 and an air humidification module 200 located over the air cleaning module 100.

The air cleaning module 100 may take in and filter external air, and may provide the filtered air to the air humidification module 200. The air humidification module 200 may be supplied with the filtered air, may humidify the filtered air to provide moisture, and may discharge the humidified air to the outside.

The air humidification module 200 may include a water tank 300 that stores water. When the air humidification module 200 is separated from the air cleaning module 100, the water tank 300 may be separated along with the air humidification module 200. The air humidification module 200 may be detachably located over the air cleaning module 100.

A user may upwardly separate the air humidification module 200 from the air cleaning module 100, and may easily clean the separated air humidification module 200. Further, the user may clean an interior of the air cleaning module 100, from which the air humidification module 200 is separated. When the air humidification module 200 is separated, a top surface of the air cleaning module 100 is open to the user.

The air cleaning module 100 may include a filter assembly 10, which will be described hereinafter, and the user may clean the air cleaning module 100 after separating the filter assembly 10 from a base body 110.

The user may supply water into the air humidification module 200. The air humidification module 200 may have a water supply passage 109, through which water may be supplied from outside to the water tank 300.

The water supply passage 109 may be formed separately from a discharge passage 107, through which air is discharged. Air to be discharged may be discharged through the discharge passage 107, and the discharge of air through the water supply passage 109 may be minimized or blocked.

The water supply passage 109 may be formed such that water may be supplied into the water tank 300 at any time. For example, even when the air humidification module 200 is in operation, water may be supplied through the water supply passage 109. For example, even when the air humidification module 200 is coupled to the air cleaning module 100, water may be supplied through the water supply passage 109. For example, even when the air humidification module 200 is separated from the air cleaning module 100, water may be supplied through the water supply passage 109. When water is supplied from above through the water supply passage 109, the water supplied from above may flow into the water tank 300 through the water supply passage 109.

The air cleaning module 100 and the air humidification module 200 may be connected to each other by a connection passage 103. As the air humidification module 200 is separable, the connection passage 103 may be distributedly provided over the air cleaning module 100 and the air humidification module 200. It is only when the air humidification module 200 is placed over the air cleaning module 100 that a flow passage of the air humidification module 200 and a flow passage of the air cleaning module 100 communicate with each other through the connection passage 103. The connection passage formed at the air cleaning module 100 may be defined as a cleaning connection passage 104, and the connection passage formed at the air humidification module 200 is defined as a humidification connection passage 105.

The air cleaning module 100 and the air humidification module 200 will be described hereinafter.

The air cleaning module 100 may include base body 110, filter assembly 10 disposed in the base body 110 and filtering air, and an air blower unit (air blower) 20 disposed in the base body 110 and blowing air. The base body 110 may include an upper body 120 and a lower body 130. The upper body 120 may be stacked on top of the lower body 130, and the upper body 120 and the lower body 130 may be assembled to each other.

Air may flow into the base body 110. An intake passage 101 may be disposed at a lower side of the lower body 130, and a filtering passage 102 may be disposed inside of the lower body 130, and an air flow passage 108 may be disposed at an upper side of the lower body 130.

In order to form the intake passage 101, a lower body supporter 190 may be disposed to support the lower body 130 from below. The filtering passage 102 may be disposed in the lower body 130 and pass through the filter assembly 10.

The air flow passage 108 may be disposed at an upper side of the air blower unit 20. The filtered air, discharged from the air blower unit 20, may flow into the water tank 300 through an air humidification inlet 31.

The filter assembly 10 may be detachably assembled to the base body 110. The filter assembly 10 includes the filtering passage 102, and filters outside air. The filter assembly 10 may be detached from the base body 10 in a horizontal direction. The filter assembly 10 may be disposed to intersect a flow direction of air that flows upstream in a vertical direction. The filter assembly 10 may slide in the horizontal direction and may filter air that flows upstream in the vertical direction. The filter assembly 10 may be disposed in the horizontal direction and may form the filtering passage 102 in the vertical direction. The filter assembly 10 may slide in the horizontal direction with respect to the base body 110.

The air blower unit 20 may be disposed above the filter assembly 10. The air blower unit 20 generates an air flow. The air blower unit 20 may be disposed inside of the base body 110 and may allow air to flow from a lower side to an upper side.

The air blower unit 20 may include a blower housing 150, a blower motor 22, and a blower fan (not shown). In this embodiment, the blower motor 22 may be disposed at an upper side of the air blower unit 20, and the blower fan may be disposed at a lower side thereof. A motor shaft of the blower motor 22 may be disposed to face downward and may be coupled to the blower fan.

The blower housing 150 may be disposed inside of the base body 110. The blower housing 150 may provide a passage for flowing air. The blower motor 22 and the blower fan may be disposed in the blower housing 150.

The blower housing 150 may be disposed above the filter assembly 10 and below the upper body 120. The blower housing 150 may have the air flow passage 108 formed therein. The blower fan may be disposed in the air flow passage 108. The air flow passage 108 may connect the filtering passage 102 and the cleaning connection passage 104.

An operating mechanism of the blower fan may be similar to a centrifugal fan, but a discharge direction of the blower fan may be inclined upward. In this embodiment, the blower fan draws in air from below, and then discharges the air outwardly and upwardly in a radial direction. An outer end of the blower fan may be disposed to be directed upward in the radial direction.

The blower motor 22 may be disposed above the blower fan to minimize contact with the flowing air. The blower motor 22 may be installed so as to be covered by the blower fan. The blower motor 22 is not located in the air flow passage formed by the blower fan, and does not generate resistance to the air blown by the blower fan.

The upper body 120 may form an exterior of the base body 110, and may be assembled to the upper side of the lower body 130. The air humidification module 200 may be detachably held in the upper body 120.

The upper body 120 may include an upper outer body 128 forming an exterior of the base body 110 and coupled to the lower body 130; an upper inner body 140 disposed inside of the upper outer body 128, having the water tank 300 inserted therein, and providing the connection passage 103; and an air guide 170 that connects the upper inner body 140 and the upper outer body 128 and guides air to the water tank 170. A water tank insertion space 125 may be formed inside of the upper inner body 140, and the water tank 300 of the air humidification module 200 may be detachably inserted into the water tank insertion space 125.

An outer side of the upper inner body 140 may communicate with the air flow passage 108. The upper inner body 140 may have an upper inlet 121 that passes through the inside and the outside of the upper inner body 140, and corresponding to the air humidification inlet 31. The air humidification inlet 31 may be disposed inside of the upper inlet 121.

The upper inlet 121 and the air humidification inlet 31 may allow the inside of the water tank 300 and the air flow passage 108 to communicate with each other. The upper inner body 140 has the water tank insertion space 125 so that the water tank 300 may be inserted therein.

As the upper body 120 is disposed to separate the connection passage and the water tank insertion space, it is possible to minimize a flow of water in the water tank 300 into the connection passage. More particularly, the connection passage, divided by the upper inner body 140, may be disposed outside of a space in which water is stored, such that it is possible to suppress water from flowing into the connection passage.

The upper inner body 140 may have an open upper side, through which the water tank 300 may be inserted. The upper inner body 140 may form a portion of the cleaning connection passage 104, into which the filtered air may flow.

The upper inner body 140 may have the upper inlet 121 corresponding to the air humidification inlet 31. The upper inlet 121 is not an essential component, and may have any shape as long as the upper body 120 to expose the air humidification inlet 31 to the connection passage 103.

The air guide 170 may guide air, supplied through the cleaning connection passage 104, to the upper inlet 121. The air guide 170 may collect air inwardly which rises along the outside of the base body 110. The air guide 170 may change a flow direction of air flowing from a lower side to an upper side. While changing the flow direction of air, the air guide 170 may minimize an angle of change of the flow direction, so as to minimize flow resistance of air.

The air guide 170 may cover 360 degrees of the outside of the upper inner body 140 along a circumference of the upper inner body 140. The air guide 170 may guide air to the water tank 300 in all 360 degrees of directions of the circumference of the water tank 300. The air guide 170 may collect air inwardly which is guided along the outside of the lower body 130, and may supply the collected air to the water tank 300. With this structure, a flow rate of air supplied to the water tank 300 may be sufficiently secured.

A handle 129 may be formed at the upper body 120. As the air humidification module 200 is held in the upper body 120, the whole humidification and air cleaning apparatus may be lifted up by the handle 129.

The cleaning connection passage (not shown) may be disposed on the outside of the upper inlet 121, and the water tank insertion space 125 may be disposed on the inside thereof. The air, flowing through the cleaning connection passage 104, may pass through the upper inlet 121. When the water tank 300 is held in the water tank insertion space 125, the filtered air, having passed through the upper inlet 121, may flow into the water tank 300.

An outer visual body 214 may be coupled to an upper side of the upper body 120. The outer visual body 214 is a component of a visual body 210, but in this embodiment, the outer visual body 214 is fixed to the upper body 120. Alternatively, the outer visual body 214 may also be fixed to the air humidification module 200. Further, alternatively, the outer visual body 214 may be omitted.

The outer visual body 214 may be fixed to the upper body 120. In this embodiment, the outer visual body 214 may be coupled to the upper outer body 128. The outer visual body 214 and the outer surface of the upper outer body 128 may form a continuous surface.

The outer visual body 214 may be formed of a material, allowing a user to see inside of the outer visual body 214. The outer visual body 214 may be formed of a transparent or translucent material, for example.

A display module (display) 160 may be disposed at at least one of the air cleaning module 100 or the air humidification module 200 to display an operating state to a user. In this embodiment, the display module 160 may be disposed at the base body 110 to display an operating state of the humidification and air cleaning apparatus to a user.

The display module 160 may be disposed on an inner surface the outer visual body 214. The display module 160 may be disposed to be closely adhered to an inner surface of the outer visual body 214. When viewed from a top, the display module 160 may have a donut shape. The water tank 300 may be inserted into the display module 160.

The display module 160 may be supported by the outer visual body 214. An inner edge of the display module 160 may be supported by an upper inner body ring 126. The display module 160 may be integrally formed with a base connector 260. An inside of the display module 160 may be supported by the upper inner body 140, and the outside thereof may be supported by the outer visual body 218.

In this embodiment, when viewed from the top, the display module 160 has a ring shape. Alternatively, the display module 160 may have an arc shape. A surface of the display module 160 may be formed of, or coated with, a light-reflective material.

Accordingly, when drops of water are formed on the visual body 210, the water drops formed on the visual body 210 may be projected onto or reflected from the surface of the display module 160. When the water drops formed on the visual body 210 flow downward, a same effect is also shown on the display module 160. This effect may give a visual stimulus to a user, such that the user may intuitively recognize that humidification is being performed. The water drop image projected on the display module 160 may have not only an emotional effect of giving a sense of refreshment to a user, but also a functional effect of informing the user of a humidification state.

The display module 160 may have an inclined upper surface. The display module 160 may be inclined toward a user, such that a height of the display module 160 is higher on the inside than on the outside.

The humidification connection passage 105 may be disposed outside of a side wall of the water tank 300. The cleaning connection passage 104 may be disposed outside of the upper inner body 150.

Hereinafter, each component of the air humidification module 200 will be described with reference to FIG. 2 or FIG. 3.

The air humidification module 200 may include water tank 300 that stores water for humidification and detachably disposed on the air cleaning module 100; a water dispensing unit (dispenser) 400 disposed in the water tank 300 and spraying water in the water tank 300; a humidification medium 50 wetted with water sprayed from the water dispensing unit 400 and providing moisture to the flowing air; visual body 210 coupled to the water tank 300 and formed of a transparent material allowing a user to see the inside thereof; a top cover assembly (top cover) 230 detachably disposed over the visual body 210 and providing the discharge passage 107, through which air is discharged, and the water supply passage 109 through which water is supplied; and a discharge grill 1400 disposed below the top cover assembly 230 and covering the discharge passage 107.

The air humidification module 200 provides humidification to the filtered air. The air humidification module 200 may implement a rain view inside of the water tank 300. The air humidification module 200 may spray and circulate water stored in the water tank 300. The air humidification module 200 may change the stored water into small droplets, and the scattered droplets may come into contact with the filtered air. Humidification and filtering may be performed while the filtered air is humidified with the scattered droplets.

The air humidification module 200 may include the water tank 300, the water dispensing unit 400, the humidification medium 50, the visual body 210, the top cover assembly 230, and handle 180. The handle 180 may be connected to the visual body 210, rotate in the visual body 210, and be held in the visual body 210. A user may simply lift up only the air humidification module 200 by the handle 180, and the handle 180 may be separated from the air cleaning module 100.

In the humidification and air cleaning apparatus according to this embodiment, a power source may be connected to the air cleaning module 100, and the air humidification module 200 may be supplied with power from the air cleaning module 100. As the air humidification module 200 may be separated from the air cleaning module 100, a separate power supply structure may be provided in which power is provided separately to the air cleaning module 100 and the air humidification module 200.

The air cleaning module 100 and the air humidification module 200 may be detachably assembled in the upper body 120, such that the base connector 260 for providing power to the air humidification module 200 may be disposed in the upper body 120. An operation module 240, which requires power, may be disposed at the top cover assembly 230 of the air humidification module 200. A top connector 270, detachably connected to the base connector 260, may be disposed in the air humidification module 200. The top connector 270 may be disposed in the top cover assembly 230.

In this embodiment, the top cover assembly 230 may be separated such that the inner surface of the visual body 210 or the inner surface of the water tank 300 may be cleaned in a convenient manner. The top cover assembly 230 may be detachably installed to the visual body 210. The top cover assembly 230 may be provided with the top connector 270 which may be electrically connected to the base connector 260.

When the top cover assembly 230 is placed on the visual body 210, the top connector 270 is disposed over the base connector 260. The top cover assembly 230 is supplied with electricity from the base connector 260 via the top connector 270.

A water level display unit (display) 247 that displays a water level of the water tank 300 may be disposed near the water supply passage 109. Accordingly, while supplying water, a user may check the water level of the water tank 300 which is not visible. By providing the water level display unit 247 at a position visible to a user while the user supplies water, it is possible to prevent excessive supply of water by the user or prevent overflow of water from the water tank 30.

The water level display unit 247 may be disposed at the top cover assembly 230. A separate power supply structure of the top connector 270 and the base connector 260 may allow effective supply of water from above.

The water tank 300 may be detachably disposed in the upper body 120. The water dispensing unit 400 may be disposed and rotate inside of the water tank 300.

The water tank 300 may include a water tank body 320 in which water is stored; the air humidification inlet 31 formed to pass through a side wall of the water tank body 320; and a water tank body extension part or portion (extension) 380 that extends upward from the water tank body 320 and coupled to the visual body 210.

The water tank body 320 has a bottom surface and a side wall, with an open upper part or portion (opening). The air humidification inlet 31 may pass through the side wall. In this embodiment, the water tank body 320 is formed in a cylindrical shape with an open upper portion. Alternatively, the water tank body 320 may be formed in various shapes.

The water tank body extension 380 may extend upward from the water tank 300. The water tank body extension 380 may form the air humidification inlet 31. The air humidification inlet 31 may be formed between the water tank body extensions 380.

The air humidification inlet 31 may pass through the side surface of the water tank body 320. The air humidification inlet 31 may be formed in all 360 degrees of directions of a circumference of the water tank body 320.

The water tank body extension 380 may guide water, flowing down from the inner surface of the visual body 210, into the water tank 300. By guiding water flowing down from the visual body 210, noise of dropping water may be minimized. The water tank body extension 380 may be coupled to a lower end of the visual body 210.

In this embodiment, the visual body 210 and the water tank 300 are manufactured separately and assembled afterwards. Alternatively, the visual body 210 and the water tank 300 may be integrally formed or the water tank 300 may be included in the visual body 210 as a component. For example, a portion of the water tank 300 may be formed of a transparent material by bi-injection molding, in which case the visual body 210 is not manufactured as a separate component.

In this embodiment, the air humidification inlet 31 is formed as a component of the water tank body 320. Alternatively, the air humidification inlet 31 may also be formed by providing the water tank body extension 380 in the visual body 210.

Further, alternatively, the air humidification inlet 31 may be formed in such a manner that some of a plurality of water tank body extensions 380 are disposed in the water tank 380 and the other are disposed in the visual body 210. In addition, alternatively, the air humidification inlet 31 may be formed as a separate component which is distinguished from the visual body 210 and the water tank 300. Moreover, alternatively, the visual body 210 may have an apertured surface, on which the air humidification inlet 31 may be formed, and the water tank 300 may also have an apertured surface on which the air humidification inlet 31 may be formed.

That is, the air humidification inlet 31 may be formed on either the water tank 300 or the visual body 210. The air humidification inlet 31 may be formed by coupling of the water tank 300 and the visual body 210. Upon providing the air humidification inlet 31 as a component which is distinguished from the water tank 300 and the visual body 210, the component may be disposed between the water tank 300 and the visual body 210. The air humidification inlet 31 may be formed by the coupling of the water tank 300 and the visual body 210.

The visual body 210 may have an upper part or portion and a lower part or portion which is open. When viewed from the top, the open upper portion and the open lower portion of the visual body 210 may have a circular shape. A diameter of the lower opening of the visual body 210 may be smaller than a diameter of the upper opening of the visual body 210.

In this embodiment, the top cover assembly 230 is inserted through the upper opening of the visual body 210, and is detachably disposed on the inner surface of the visual body 210.

The water dispensing unit 400 has a function of supplying water to the humidification medium 50. The water dispensing unit 400 has a function of visualizing the humidification process. The water dispensing unit 400 implements a rain view inside of the air humidification module 200.

The water dispensing unit 400 may draw in water stored in the water tank 300 by rotating humidification housing 800, pump upward the drawn water, and spray the pumped water outwardly in the radial direction. The water dispensing unit 400 may include the humidification housing 800 which draws in water, pumps upward the drawn water, and then sprays the pumped water outwardly in the radial direction.

In this embodiment, the humidification housing 800 may rotate to spray water. Alternatively, a nozzle may be used instead of the humidification housing 800 to spray water. As water is sprayed from the nozzle, the water may be supplied to the humidification medium 50 and a rain view may also be similarly implemented. Depending on embodiments, water may be sprayed from the nozzle or the nozzle may rotate.

The water sprayed from the humidification housing 800 serves to wet the humidification medium 50. The water sprayed from the humidification housing 800 may be sprayed toward at least either the visual body 210 or the humidification medium 50.

Water sprayed toward the visual body 210 may be used to implement a rain view. Water sprayed toward the humidification medium 50 may be used to humidify the filtered air. The rain view may be implemented by spraying water toward the visual body 210, and then water flowing down from the visual body 210 may be used to wet the humidification medium 50.

In this embodiment, a plurality of nozzles having different heights may be provided for the humidification housing 800. Water discharged from any one of the nozzles may form droplets on the inner surface of the visual body 210 to create a rain view, and water discharged from the other nozzle may wet the humidification medium 50 for use in humidification.

The humidification housing 800 may spray water to the inner surface of the visual body 210, and the sprayed water may flow down along the inner surface of the visual body 210. Droplets, shown in the form of drops of water, may be formed on the inner surface of the visual body 210, and a user may see the droplets through the visual body 210.

More particularly, water flowing down from the visual body 210 may wet the humidification medium 50 for use in humidification. The humidification medium 50 may be wetted with water sprayed from the humidification housing 800 and water flowing down from the visual body 210.

The visual body 210 may be coupled to the water tank 300, and may be disposed above the water tank 300. At least a portion of the visual body 210 may be formed of a material allowing a user to see the inside thereof.

The display module 160 may be disposed outside of the visual body 210. The display module 160 may be coupled to either one of the visual body 210 or the upper body 120.

The display module 160 may be disposed at a position at which the rain view may be observed by a user. In this embodiment, the display module 160 may be disposed at the upper body 120.

When the air humidification module 200 is placed on the visual body 210, an outer surface of the visual body 210 is closely adhered to the display module 160. At least a portion of the surface of the display module 160 may be formed of or coated with a light-reflective material.

The droplets formed on the visual body 210 may also be projected onto the surface of the display module 160. Accordingly, a user may observe motion of droplets at both the visual body 210 and the display module 160.

The water tank 300 may have the air humidification inlet 31 through which air passes. The air humidification inlet 31 may be provided between the connection passage 103 and a humidification passage 106. The air humidification inlet 31 may be an outlet of the connection passage 103 and an inlet of the humidification passage 106.

The filtered air, supplied from the air cleaning module 100, may flow into the air humidification module 200 (water tank in this embodiment) through the air humidification inlet 31. The humidification medium 50 may be disposed at the air humidification inlet 31 and may cover the air humidification inlet 31.

The humidification medium 50 may be disposed at at least one of the following positions: on a same plane as the air humidification inlet 31, or on the outside or the inside of the air humidification inlet 31. The humidification medium 50 is wetted with water for humidification, such that the humidification medium 50 is desirably disposed inside the air humidification inlet 31. That is, the humidification medium 50 is desirably disposed on the inside of the water tank 300.

Water flowing down after wetting the humidification medium 50 is stored in the water tank 300. The humidification medium 50 humidifies the filtered air passing through the air humidification inlet 31.

The filtered air is humidified by water naturally evaporated from the humidification medium 50. The term "natural evaporation" means that water evaporates in a state in which separate heat is not applied to the water. Natural evaporation may be promoted as contact with air increases, a flow velocity of air increases, and a pressure in the air decreases. Natural evaporation may also be referred to as "natural vaporization".

The humidification medium 50 may promote the natural evaporation of water. In this embodiment, the humidification medium 50 is wetted with water but is not immersed in the water tank 300.

The humidification medium 50 may be spaced apart from the water stored in the water tank 300, such that even when water is stored in the water tank 300, the humidification medium 50 is not always in a wet state. That is, the humidification medium 50 may be in a wet state only during operation of a humidification mode, and during operation of an air cleaning mode, the humidification medium 50 may be maintained in a dry state.

The humidification medium 50 may cover the air humidification inlet 31, and the filtered air may pass through the humidification medium 50 to flow into the water tank 300. As the filtered air passes through the air humidification inlet 31, an air flow length may be minimized.

The top cover assembly 230 forming the discharge passage 107 will be described hereinafter.

Figure 4:
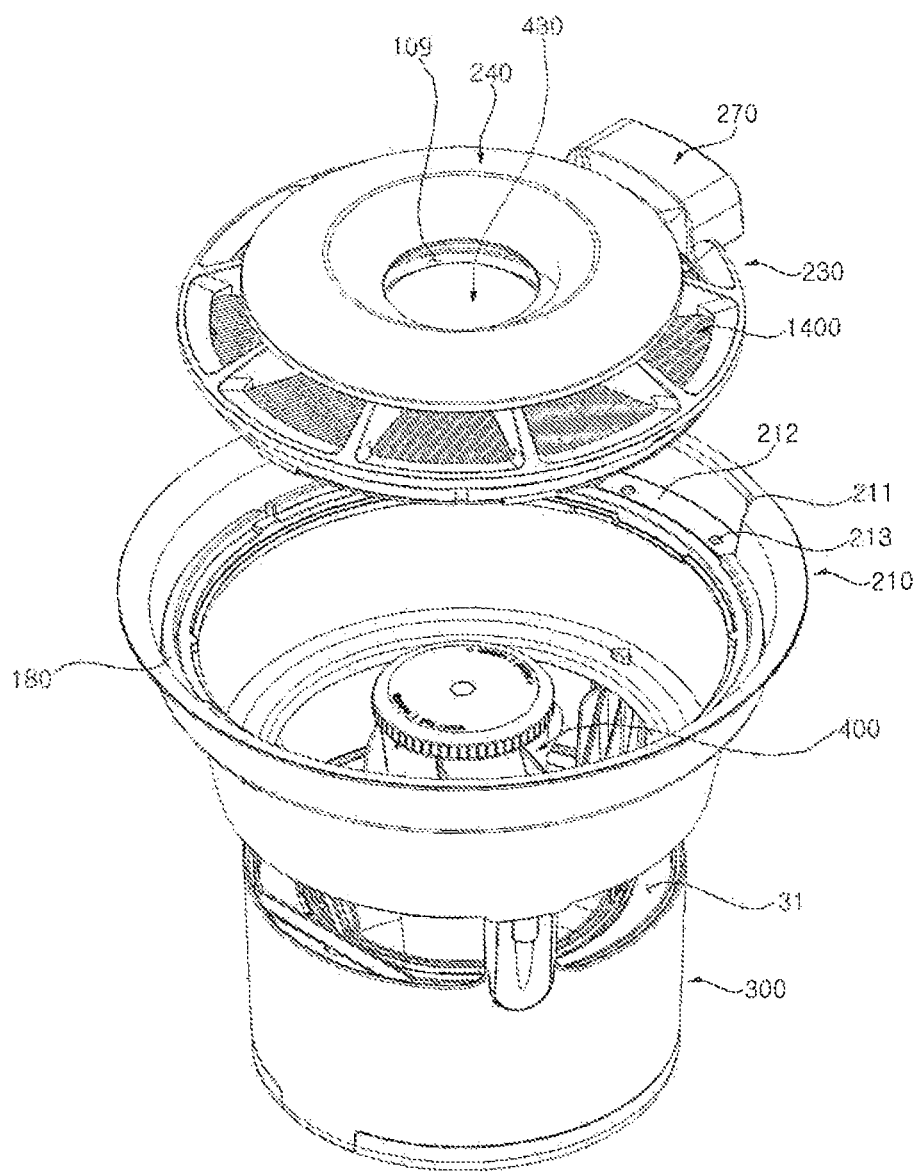
FIG. 4 is a perspective view of an air humidification module of FIG. 2, from which a top cover assembly is separated.
Figure 5:
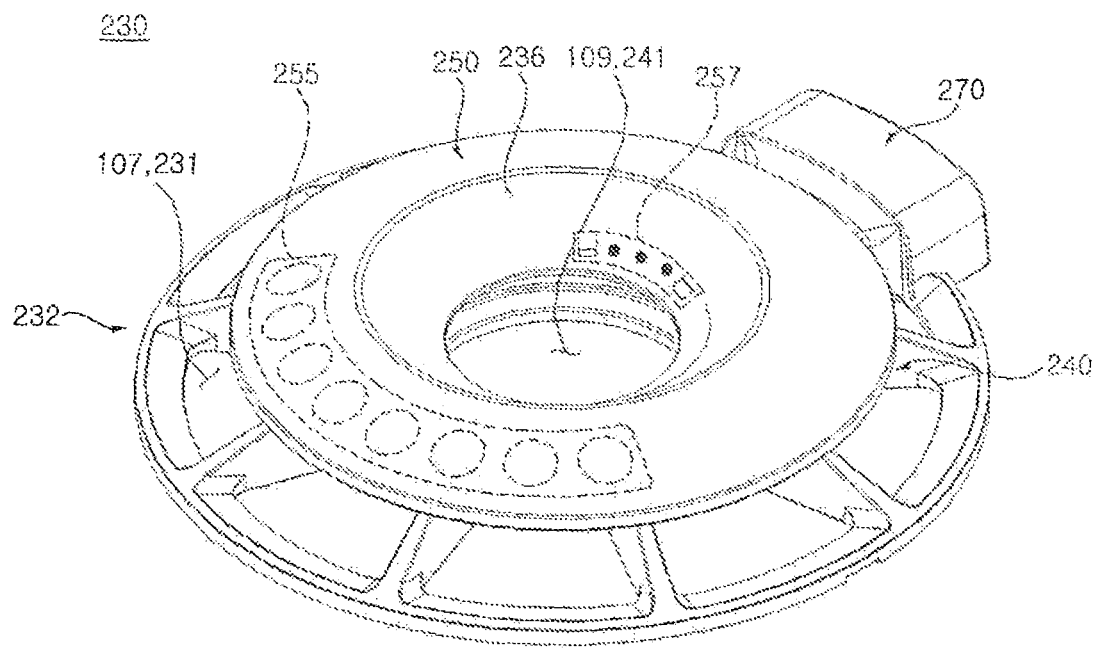
FIG. 5 is an isolated perspective view of the top cover assembly and discharge grill of FIG. 4.
Figure 6:
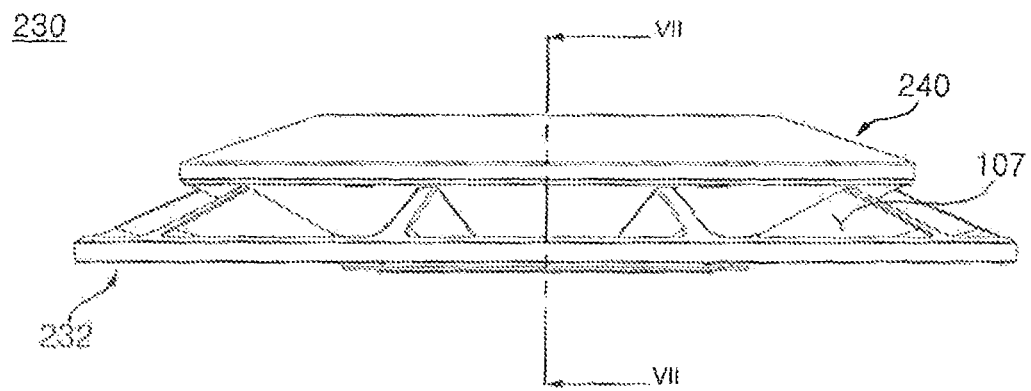
FIG. 6 is a front view of the top cover assembly and discharge grill of FIG. 5.
Figure 7:
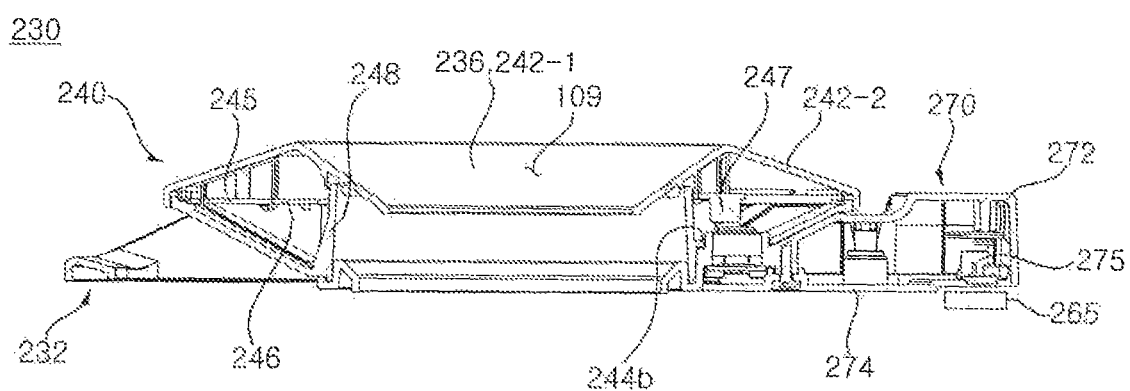
FIG. 7 is a cross-sectional view, taken along line VII-VII of FIG. 6.

FIG. 4 is a perspective view of an air cleaning module of FIG. 2, from which a top cover assembly is separated. FIG. 5 is an isolated perspective view of the top cover assembly and discharge grill of FIG. 4. FIG. 6 is a front view of the top cover assembly and discharge grill of FIG. 5. FIG. 7 is a cross-sectional view, taken along line VII-VII of FIG. 6. FIG. 8 is an exploded perspective view of the top cover assembly of FIG. 5, from which an upper operation housing is separated. FIG. 9 is a perspective view of FIG. 8 when viewed from the bottom. Referring to FIGS. 4 to 9, top cover assembly 230 according to an embodiment will be described hereinafter.

In this embodiment, the top cover assembly 230 is placed over the visual body 210. Alternatively, if the visual body 210 is integrally formed with the water tank 300, the top cover assembly 230 may be disposed at an open upper part or portion of the water tank 300.

Further, in this embodiment, the top cover assembly 230 may be detachably placed over the visual body 210. The top cover assembly 230 provides not only the discharge passage 107, but also the water supply passage 109 for supplying water.

The top cover assembly 230 may be disposed above discharge grill 1400. In this embodiment, the discharge grill 1400 is disposed at the open upper portion of the visual body 210, and may be detachably disposed on the inner surface of the visual body 210.

The top cover assembly 230 may be integrally assembled with the discharge grill 1400. After the top cover assembly 230 and the discharge grill 1400 are manufactured separately, the discharge grill 1400 and the top cover assembly 230 may be stacked on top of each other in a vertical direction.

In this embodiment, the top cover assembly 230 is disposed above the discharge grill 1400, and placed not on the discharge grill 1400 but on the visual body 210. That is, the discharge grill 1400 and the top cover assembly 230 each may be detachably disposed on the inner surface of the visual body 210.

The top cover assembly 230 may be placed on the visual body 210 and supported thereby, without applying a load to the discharge grill 1400. The top cover assembly 230 may be disposed at the open upper portion of the visual body 210. The top cover assembly 230 may include a top cover grill 232 forming the discharge passage 107 and the water supply passage 109; an operation module 240 installed at the top cover grill 232; and top connector 270 that provides power or signals to the operation module 240.

The top cover grill 232 may include a grill discharge port 231, forming at least a portion of the discharge passage 107, and a grill water supply port 233 forming at least a portion of the water supply passage 109. The grill discharge port 231 and the grill water supply port 233 are open in a vertical direction. The grill water supply port 233 may be disposed at a center of an inside of the top cover grill 232, and the grill discharge port 231 may be disposed outside of the grill water supply port 232.

The top cover grill 232 may be detachably placed on the visual body 210. The top cover grill 232 may be placed on the inner surface of the visual body 210.

The operation module 240 may be coupled to the top cover grill 232. The operation module 240 may receive control signals from a user. The operation module 240 may transmit water level information to a user. The water supply passage 109 may be disposed in the operation module 240. The operation module 240 may be electrically connected to the top connector 270, and may be supplied with power from the top connector 270.

The operation module 240 may include an operation housing 250 coupled to the discharge grill 232 and having at least a portion of the water supply passage 109 formed therein, an operation space 243 formed inside of the operation housing 250, an input unit (input) 245 disposed on the operation housing 250, water level display unit (display) 247 disposed on the operation housing 250, and an operation controller 246 controlling the input unit 245 and the water level display unit 247.

The operation housing 250 may include an upper operation housing 242 and a lower operation housing 244. The operation space 243 may be formed between the upper operation housing 242 and the lower operation housing 244, and the operation space 243 may be sealed to prevent water from entering. The input unit 245, the water level display unit 247, and the operation controller 246 may be disposed in the operation space 243.

The water supply passage 109 may be formed in the operation module 240. A portion of the water supply passage 109 may be vertically formed at a center of the operation module 240. An operation water supply port 241, forming at least a portion of the water supply passage 109, may be formed in the operation module 240. The operation water supply port 241 may be disposed inside of the operation housing 250, and may be open in a vertical direction.

The operation water supply port 241 may be formed by an inner wall 248. The inner wall 248 may be disposed on at least one of the upper operation housing 242 and the lower operation housing 244. In this embodiment, the lower operation housing 244 is integrally formed with the inner wall 248. Alternatively, the upper operation housing 242 may be integrally formed with the inner wall 248, such that the operation space 243 may be formed between the upper operation housing 242, the lower operation housing 244, and the inner wall 248.

An upper water supply guide 236 that guides water, supplied from above, into the operation water supply port 241 may be disposed in the upper operation housing 242. The upper water supply guide 236 may be manufactured as a separate component, or a portion of the surface of the upper operation housing 242 may be used to form the upper water supply guide 236 thereon.

The upper operation housing 242 according to this embodiment may include an inner inclined surface 242-1 and an outer inclined surface 242-2. An inner surface of the upper operation housing 242, disposed adjacent to the operation water supply port 241, may be inclined to form the upper water supply guide 236 thereon.

A direction of inclination of the outer inclined surface 242-2 may be opposite to that of the upper water supply guide 236. While the inner inclined surface 242-1 is inclined toward the operation water supply port 241, the outer inclined surface 242-2 is inclined outwardly.

The input unit 245 may be a touch panel that senses a user's touch operation. The input unit 245 may receive input of a user's touch operation using capacitive sensing or static pressure sensing, for example. Alternatively, the input unit 245 may be a button.

The input unit 245 may be disposed on a bottom surface of the upper operation housing 242. The input unit 245 may be provided with a light emitting member (not shown), and light may be selectively emitted from the light emitting member.

For example, if it is required to receive a user's operation signal, the input unit 245 may emit light. For example, if a user needs to recognize an operation signal input by the user, the input unit 245 may emit light. Further, when the humidification and air cleaning apparatus is operated according to an operation signal input by the user, the input unit 245 may emit light.

A surface of the upper operation housing 242 may be coated with a material, through which light may be selectively transmitted. Accordingly, light emitted from the input unit 245 may be transmitted through the upper operation housing 242, and may be seen by a user. When light is not emitted from the input unit 245, external light is reflected from the surface of the upper operation housing 242, and the user may not identify a position of the input unit 245.

The input unit 245 may be disposed at a lower side of the outer inclined surface 242-2. The water level display unit 247 may be disposed at a lower side the inner inclined surface 242-1.

The input unit 245, the operation water supply port 241, and the water level display unit 247 may be disposed on or in a straight line. More particularly, the input unit 245, the operation water supply port 241, and the water level display unit 247 may be disposed on or in a straight line when seen from a user's viewpoint.

The input unit 245 may be disposed at the front, the operation water supply port 241 may be disposed behind the input unit 245, and the water level display unit 247 may be disposed behind the operation water supply port 241. Accordingly, when a user supplies water from above, the user may check the water level display unit 247 while pouring water into the operation water supply port 241.

The operation housing 250 may have an input unit display area 255, on which the input unit 245 may be displayed, and a water level display area 257 on which the water level unit 247 may be displayed. The inner inclined surface 242-1 and the outer inclined surface 242-2 are inclined in opposite directions with respect to the operation water supply port 241, but may be inclined in the same direction when seen from a user's viewpoint.

The input unit display area 255 may be provided on the outer inclined surface 242-2, and the water level display area 257 may be provided on the inner inclined surface 242-1. The input unit display area 255 and the water level display area 257 may be inclined in the same direction when viewed from a user's viewpoint. The input unit display area 255 and the water level display area 257 may be inclined forwardly.

The operation controller 246 may sense a signal of the input unit 245, analyze the signal of the input unit 245, and transmit the analyzed signal to a controller (not shown). The controller may be disposed in the base body 110.

The input unit 245 may be hidden in the upper operation housing 242, and light may be emitted from the input unit 245 only while the input unit 245 is in operation, such that a user may identify the position of the input unit 245. The input unit 245, the water level display unit 247, and the operation controller 246 may be supplied with power from the base connector 260.

The operation space 243 may be sealed to prevent water from entering. That is, a gasket 249 may be interposed between the upper operation housing 242 and the lower operation housing 244.

The operation housing 250 and the top connector 270 may be manufactured separately and then assembled. In this embodiment, the operation controller 246 and the top connector 270 may be connected through the lower operation housing 244. A connector connection hole 244a for connection with the top connector 270 may be formed at the lower operation housing 244.

A portion of the top connector 270 may be inserted by passing through the connector connection hole 244a, and electrically connected to components inside of the operation space 243. As the top connector 270 is connected through the lower operation housing 244, a sealing structure may be easily provided. Even when water flows down the outer inclined surface 242-2, it is possible to prevent water from passing through the connector connection hole 244a.

The top connector 270 may be assembled with the operation module 240 to form the top cover assembly 230. The top connector 270 and the base connector 260 may be separated from each other, such that the top cover assembly 230 may be detachably placed on the visual body 210, and may transmit and receive power or electric signals to and from the base body 110. When the top connector 270 is placed over the base connector 260, the top connector 270 is electrically connected to the base connector 260, and when the top connector 270 is separated from the base connector 260, the top connector 270 is electrically disconnected from the base connector 260.

The top connector 270 may be placed over the base connector 260 without any separate structure. For example, when the top cover assembly 230 is placed on the visual body 210, the top connector 270 and the base connector 260 may be disposed on the outer side of the visual body 210.

In this embodiment, the top connector 270 is disposed on the inner side the visual body 210, such that the top connector 270 is disposed at an upper part or portion of the visual body 210, and the base connector 260 may be disposed at a lower part or portion of the visual body 210. That is, the top connector 270 and the base connector 260 may be separated from each other with respect to the visual body 210 serving as a boundary. Accordingly, the top connector 270 and the base connector 260 may transmit power and signals through the visual body 210.

In this embodiment, the top connector 270 and the base connector 260 may be electrically connected by direct contact, in which power may be supplied thereto. Further, in this embodiment, the top connector 270 and the base connector 260 may transmit signals by wireless communication. Alternatively, communication signals may also be transmitted by direct contact therebetween.

The visual body 210 may have a connector support 212, on which the top connector 270 may be placed. At least a portion of the top connector 270 may be placed on the connector support 212. The top connector 270 may be placed on the connector support 212, and the base connector 260 may be disposed below the connector support 212.

When the top connector 270 is placed on the connector support 212, its horizontal movement is restricted. That is, the visual body 210 may have a connector stopper 211 for limiting a horizontal movement of the top connector 270.

When the top connector 270 is placed, the connector stopper 211 is closely adhered to a side portion of the top connector 270.

The visual body 210 may have a connector opening 213. The connector opening 213 may pass through the visual body 20. The connector opening 213 may be open in a vertical direction.

The connector opening 213 and the connector support 212 may be disposed at different positions. In this embodiment, the connector opening 213 is formed at the connector support 212. A portion of the connector support 212 is open to form the connector opening 213.

A first connector electrode 261 may be disposed in at least any one of the top connector 270 and the base connector 260, and a second connector electrode 271 may be dispose in the other thereof. The first connector electrode 261, disposed in any one of the top connector 270 and the base connector 260 may pass through the connector opening 213 to come into contact with the second connector electrode 271 disposed on the other thereof.

While in contact with each other, the first connector electrode 261 and the second connector electrode 271 may be electrically connected to each other, and when separated from each other, the first connector electrode 261 and the second connector electrode 271 may be electrically disconnected from each other.

In this embodiment, the first connector electrode 261 is disposed in the base connector 260, and the second connector electrode 271 is disposed in the top connector 270. Alternatively, the first connector electrode 261 may be disposed in the top connector 270, and the second connector electrode 271 may be disposed in the base connector 260.

The top connector 270 may have a top connector housing 272 and a top connector cover 274. In this embodiment, the top connector housing 272 may be integrally formed with the top cover grill 232. Alternatively, the top connector housing 272 may be manufactured separately, and then may be assembled to the top cover grill 232.

The top connector housing 272 may have an open lower surface. The top connector cover 274 may be assembled to the top connector housing 272 and covers a bottom surface of the top connector housing 272.

The base connector 260 and the top connector 270 may communicate with each other to transmit electric signals, except power, in a contactless manner. Various communication modules may be used for wireless communication between the base connector 260 and the top connector 270.

The base connector 260 and the top connector 270 may be located adjacent to each other, and use a communication method, such infrared (IR), Zigbee, near-field communication (NFC), or Bluetooth), for example, which are appropriate for a local area network. In this embodiment, the base connector 260 and the top connector 270 communicate with each other via an IR signal. In order to transmit the IR signal, the connector support 212 is required to be formed of a material for the signal to pass therethrough. In this embodiment, the connector support 212 is formed of a transparent material. As the entire visual body 210 is formed of a transparent material allowing light to be transmitted therethrough, a separate material only for the connector support 212 is not required.

The base connector 260 may have a base connector window 263 through which the IR signal may be transmitted. The top connector 270 may have a top connector window 273 through which the IR signal may be transmitted.

A top connector communicator 275 may be disposed at an upper side of the top connector window 273. A base connector communicator 265 may be disposed at a lower portion of the based connector window 263.

A signal, transmitted from the top connector communicator 275, may be sent to the base connector communicator 265 via the top connector window 273, the connector support 212, and the base connector window 263. By contrast, a signal, transmitted from the base connector communicator 265, may be sent to the top connector communicator 275 via the base connector window 263, the connector support 212, and the top connector window 273.

The signal, transmitted from the top connector communicator 275 to the base connector communicator 265, may be, for example, a user's operation signal input to the operation module 240. The signal, transmitted from the base connector communicator 265 to the top connector communicator 275, may be, for example, a signal for controlling the water level display unit 247.

Figure 10:
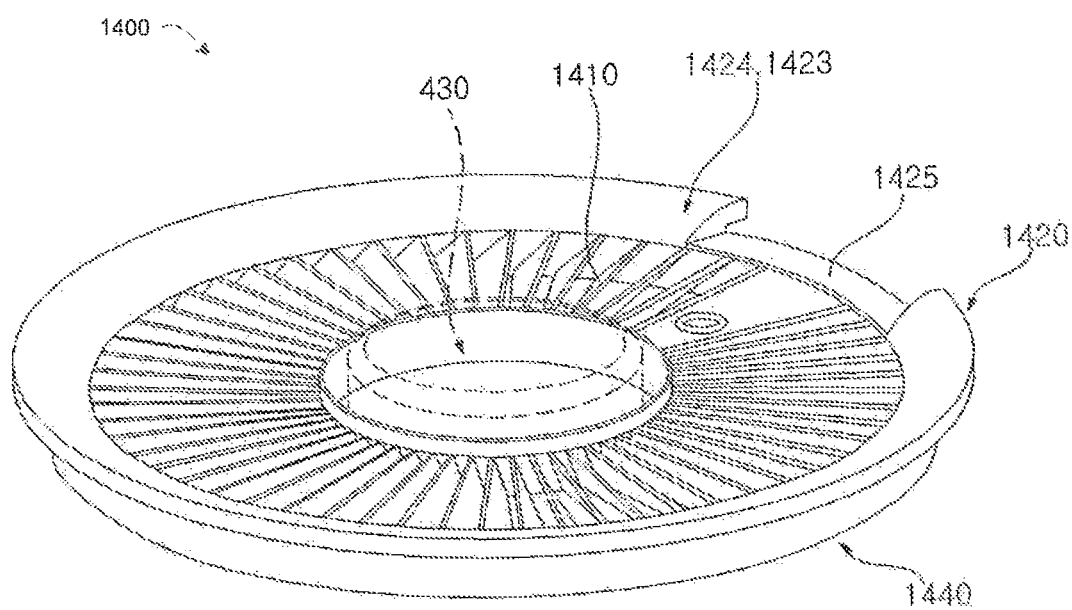
FIG. 10 is a perspective view of discharge grill of FIG. 4.
Figure 11:
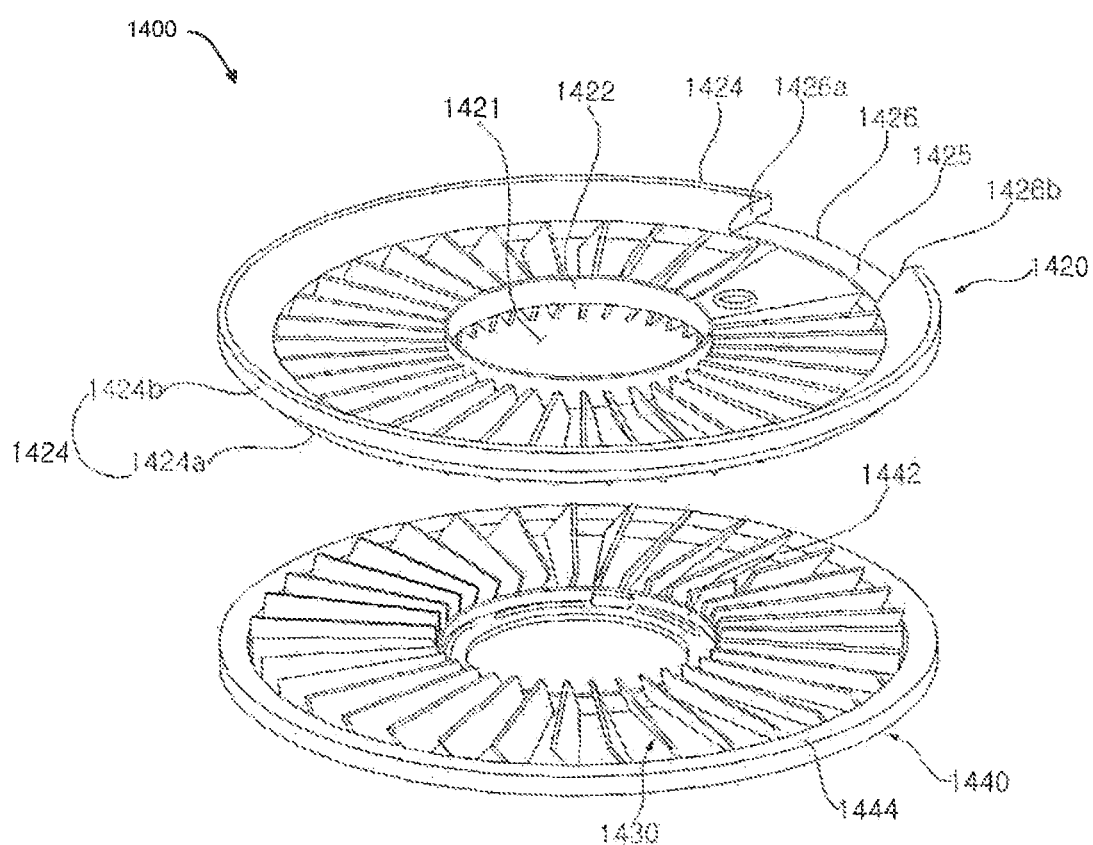
FIG. 11 is an exploded perspective view of the discharge grill of FIG. 10.
Figure 12:
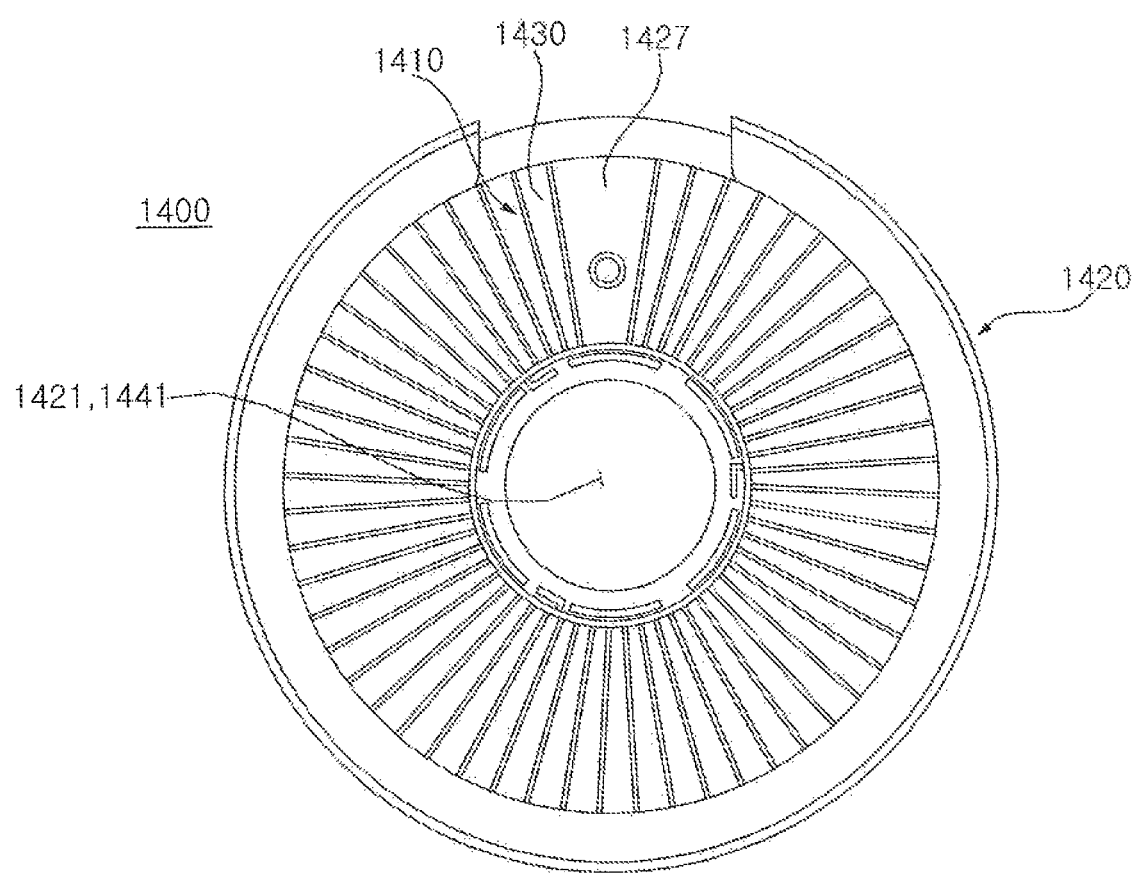
FIG. 12 is a plan view of the discharge grill of FIG. 10.
Figure 13:
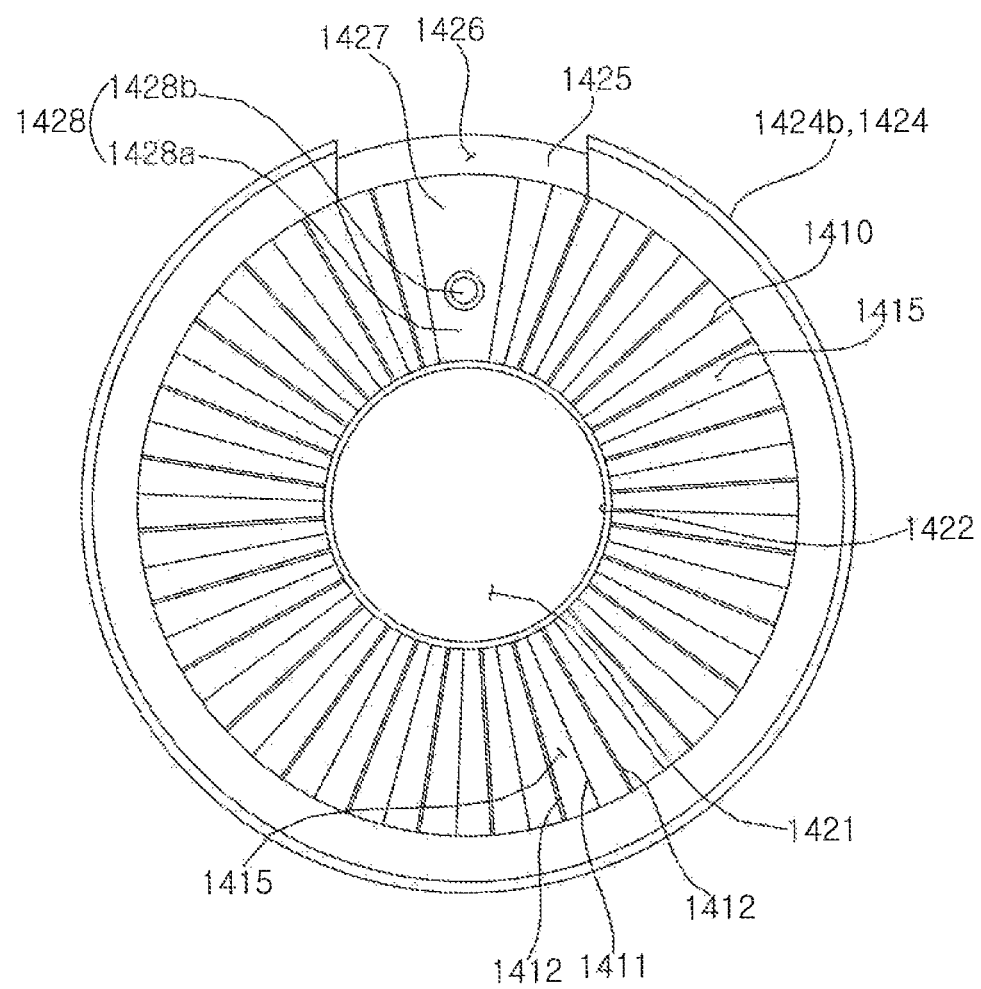
FIG. 13 is a plan view of an upper grill of FIG. 11.
Figure 14:
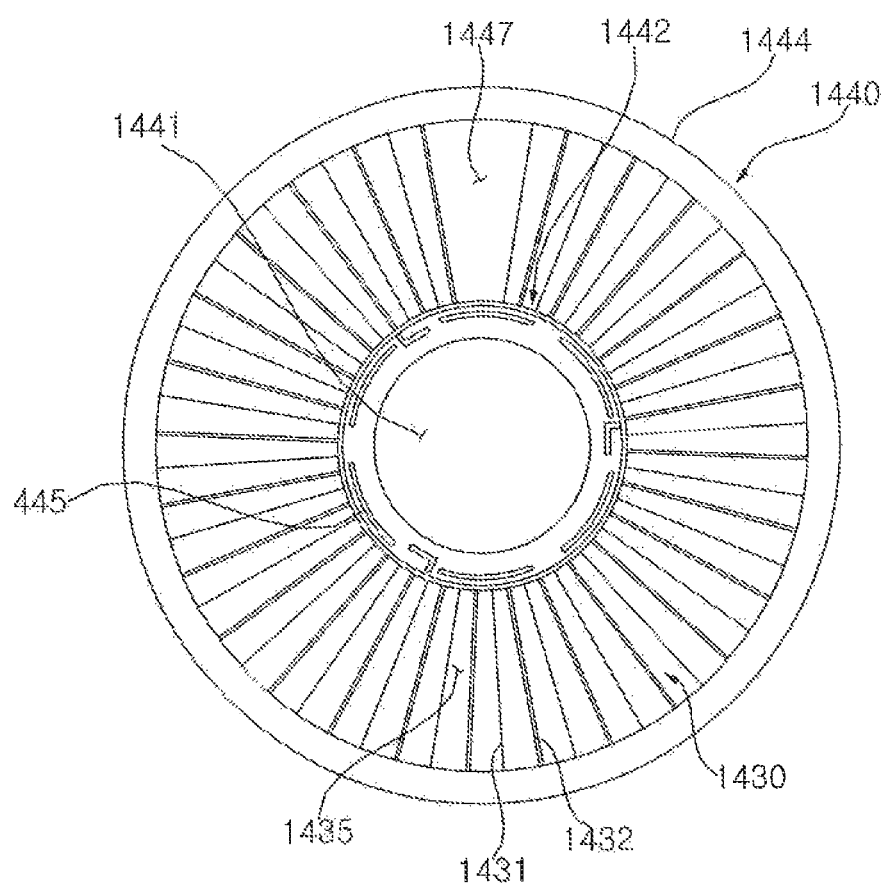
FIG. 14 is a plan view of a lower grill of FIG. 11.
Figure 15:
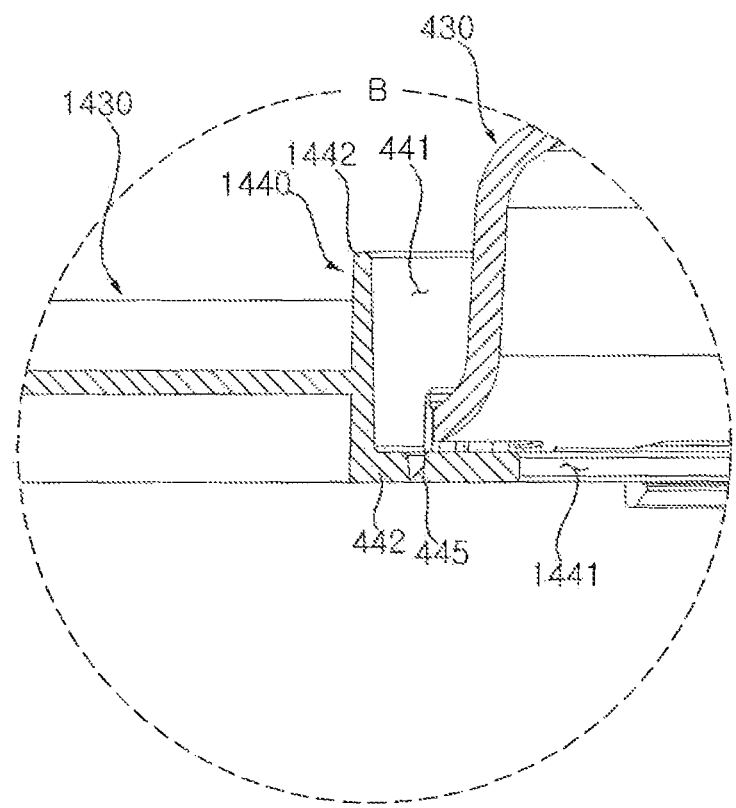
FIG. 15 is a cross-sectional view of a connection structure of a discharge grill and a water supply cap of FIG. 6.

FIG. 10 is a perspective view of a discharge grill of FIG. 4. FIG. 11 is an exploded perspective view of the discharge grill of FIG. 10. FIG. 12 is a plan view of the discharge grill of FIG. 10. FIG. 13 is a plan view of an upper grill of FIG. 11. FIG. 14 is a plan view of a lower grill of FIG. 11.

The discharge grill 1400 according to this embodiment has vanes in a first layer and vanes in a second layer, the vanes being vertically arranged in a staggered manner, thereby preventing the water tank 300 from being directly seen through the grill discharge port 231. The discharge grill 1400 may be disposed at a lower part or portion of the top cover assembly 230. The discharge grill 1400 may discharge air, while minimizing direct discharge of droplets into an indoor space. The discharge grill 1400 may cover the open upper side of the visual body 210.

The discharge grill 1400 may be disposed below the grill discharge port 231 and minimize discharge of droplets to the grill discharge port 231. Fine droplets may flow with air to be discharged through the grill discharge port 231. The discharge grill 1400 may prevent droplets from being scattered upward in a vertical direction through the grill discharge port 231.

The discharge grill 1400 may include an upper grill 1420, on which a plurality of upper vanes 1410 may be disposed, and a lower grill 1440 which may be disposed below the upper grill 1420 and coupled to the upper grill 1420 and on which a plurality of lower vanes 1430 may be disposed.

The upper grill 1420 and the lower grill 1440 may be integrally formed with each other. In this embodiment, the lower grill 1440, disposed below the upper grill 1440, is placed on the visual body 210.

The upper grill 1420 may include an upper inner frame 1422 having an upper grill water supply port 1421 formed at a center thereof, an upper outer frame 1424 spaced apart from the upper inner frame 1422 and formed to surround the upper inner frame 1422, and the plurality of upper vanes 1410 connecting the upper inner frame 1422 and the upper outer frame 1424.

The upper inner frame 1422 and the upper outer frame 1424 may be formed in various shapes. In this embodiment, the upper inner frame 1422 and the upper outer frame 1424 are formed in a ring shape. A diameter of the upper outer frame 1424 may be larger than a diameter of the upper inner frame 1422.

The upper outer frame 1424 may include a holder 1425 on which the top connector 270 may be placed. The holder 1425 may be formed to be flat. More particularly, a bottom surface of the top connector cover 274 of the top connector 270 may be seated on the holder 1425. After the top connector 270 may be seated on the holder 1425, the top connector 270 may be inserted into an installation groove 1426 of the upper outer frame 1424, such that a horizontal movement of the top connector 270 may be restricted. The installation groove 1426 may have a height greater than a height of the holder 1425.

Stepped portions 1426a and 1426b may be formed between the upper outer frame 1424 and the holder 1425, and the installation groove 1426 may be formed by the stepped portions 1426a and 1426b. An outer surface of the top connector 270 may be seated on the holder 1425, and then engaged with the stepped portions 1426a and 1426b, thereby limiting movement of the top connector 270. After the top connector 270 is inserted into the installation groove 1426, the top connector 270 may move only in an upward-downward or vertical direction, and its horizontal movement restricted.

The upper outer frame 1424 may include a frame 1424a, coupled to an outer end of the upper vanes 1410, and a guide 1424b disposed at an upper side of the frame 1424a. The frame 1424a may be formed in a ring shape. The outer end of the upper vanes 1410 is coupled to an inner surface of the frame 1424a.

The guide 1424b may be disposed at an upper side of the frame 1424a, and is integrally formed with the frame 1424a. The guide 1424b may have an inner surface 1423 which may be a curved surface. The frame 1424a may be formed with a surface smoothly curved toward an outer end of the upper vanes 1410. The inner surface 1423 of the frame 1424a may be formed continuously with an inner surface of the guide 1424b, thereby minimizing resistance of the discharged air. The guide 1424b may have a diameter that increases toward an upper side, such that air flowing upward may be diffused easily.

The upper inner frame 1422 may be formed in a ring shape. The upper grill water supply port 1421 may be formed on an inner surface of the upper inner frame 1422. The upper grill water supply port 1421 may pass through vertically.

The upper grill water supply port 1421 may form a portion of the water supply passage 109. The upper grill water supply port 1421 may be disposed below the operation water supply port 241.

An inner end of the upper vanes 1410 may be coupled to an outer surface of the upper inner frame 1422. A height of the upper inner frame 1422 may be greater than a vertical height of the upper vanes 1410.

A water supply cap 430 may be disposed at the upper grill water supply port 1421. Water, supplied from above, may be temporarily stored in a space between the upper inner frame 1422 and the water supply cap 430. In order to prevent the temporarily stored water from overflowing to the upper vanes 1410, an upper end of the upper inner frame 1422 may be higher than an upper end of the upper vanes 1410.

The upper vanes 1410 may be inclined relative to the upward-downward direction. When viewed from the top, the plurality of upper vanes 1410 may be inclined in a clockwise or counterclockwise direction.

In this embodiment, a planar center of the upper grill 1420 is located within the upper grill water supply port 1421. The humidification housing 800 may be disposed below the upper grill water supply port 1421, and the center of the upper grill 1420 may be located on a rotational axis of the water dispensing unit 400.

In this embodiment, the upper vanes 1410 may be arranged in a circumferential direction with respect to the upper grill water supply port 1421. More particularly, the upper vanes 1410 may be arranged in a circumferential direction with respect to a center of the upper grill 1420.

In this embodiment, the upper vanes 1410 are inclined in a clockwise direction, such that either one of an edge 1411 on one or a first side of the upper vanes 1410 or an edge 1412 on the other or a second side of the upper vanes 1410 may be disposed higher and the other one may be disposed lower. In this embodiment, when viewed from the top, the edge 1411 disposed on the first side of the upper vanes 1410 in a clockwise direction is disposed higher, and the edge 1412 disposed on the second side in a counterclockwise direction is disposed lower.

With respect to two adjacent upper vanes 1410, a first discharge area 1415 is formed between the edge 1411 on the first side of the two adjacent upper vanes 1410 and the edge 1412 on the second side thereof. The first discharge area 1415 is formed between each of two adjacent upper vanes 1410. Air may be discharged through the first discharge area 1415. The two adjacent upper vanes 1410 may guide the air to the first discharge area 1415. In this embodiment, the first discharge area 1415 has a width which is smaller at a portion in contact with the upper inner frame 1422, and which is larger at a portion being in contact with the upper outer frame 1424.

The first discharge area 1415 may be disposed outside of the upper inner frame 1422 and radially disposed with respect to the upper inner frame 1422. More particularly, a plurality of first discharge areas 1415 may be arranged in a circumferential direction of the upper inner frame 1422.

The plurality of first discharge areas 1415 may be directed toward the center of the upper grill 1420. Further, air may be discharged in a direction of inclination of two adjacent upper vanes 1410. The plurality of upper vanes 1410 may be arranged in a clockwise direction, such that the air passing through the upper grill 1420 may be radially discharged, while generating a spiral air flow in an upwardly inclined direction.

In addition, the upper grill 1420 may further includes a sensor 1428. The sensor 1428 may interact with a position sensor 278 disposed at the top cover assembly 230 and provide an electromagnetic signal to the position sensor 278.

The sensor 1428 may provide a signal indicating that the top cover assembly is placed in position. If the top cover assembly 230 is placed in a wrong position, the sensor 1428 may not provide a signal to the position sensor 278.

The sensor 1428 may connect the upper inner frame 1422 and the upper outer frame 1424, may be disposed at a lower portion of the top connector 270, and may support the top connector 270. More specifically, the sensor 1428 may be disposed below the top connector cover 274. The sensor 1428 may have an area equal to or smaller than an area of the top connector cover 274. Both edges of the sensor 1428 may be disposed within both sides of the top connector cover 274, without deviating from the top connector cover 274.

The first discharge area 1415 is disposed on each of one or a first side and the other or a second side of the sensor 1428 in a clockwise direction. The sensor 1428 may include a sensing plate 1428a that connects the upper inner frame 1422 and the upper outer frame 1424, and a signal providing member 1428b installed at the sensing plate 1428 and providing a signal to the position sensor 278.

In this embodiment, a Hall sensor that senses a magnetic signal is used as the position sensor 278, and a permanent magnet is used as the signal providing member 1428. The position sensor 278 senses a magnetic force of the signal providing member 1428b, and senses a home position of the top cover assembly 230. If the position sensor 278 senses that the top cover assembly 230 is in a wrong position, an error may be displayed on the display module 160 or the operation module 240. The sensing plate 1428a may be flat and face a bottom surface of the top connector cover 274.

The lower grill 1440 may include a lower inner frame 1442 having a lower grill water supply port 1441 formed at a center thereof; a lower outer frame 1444 spaced apart from the lower inner frame 1442 and formed to surround the lower inner frame 1442; and a plurality of lower vanes 1430 that connects the lower inner frame 1442 and the lower outer frame 1444. In this embodiment, the lower inner frame 1442 and the lower outer frame 1444 are formed in a ring shape. A diameter of the lower outer frame 1444 may be greater than a diameter of the lower inner frame 1442.

The lower inner frame 1442 may have a shape corresponding to the upper inner frame 1422, and the lower outer frame 1444 may have a shape corresponding to the upper outer frame 1424. A shape of the lower vanes 1430 may be the same as a shape of the upper vanes 1410.

The lower grill water supply port 1441 may be disposed below the upper grill water supply port 1421 and corresponds to a shape of the upper grill water supply port 1421. In this embodiment, the water supply cap 430 is disposed on an inner side of the lower grill water supply port 1441 and the upper grill water supply port 1421. The water supply cap 430 may be installed over the lower grill water supply port 1441 and the upper grill water supply port 1421. An upper end of the water supply cap 430 may protrude upward from the upper grill 1420, and protrude toward an operation water supply port 241 of the top cover assembly 230.

A plurality of lower vanes 1430 may be arranged in a circumferential direction with respect to the lower grill water supply port 1441. More particularly, the lower vanes 1430 may be arranged in a circumferential direction with respect to the center of the lower grill 1440.

In this embodiment, the lower vanes 1430 are inclined in a counterclockwise direction, such that either one of an edge 1431 on one or a first side of the lower vanes 1430 or an edge 1432 on the other or a second side of the lower vanes 1430 may be disposed higher and the other one may be disposed lower. When viewed from the top, the edge 1431 disposed on the first side of the lower vanes 1430 in a counterclockwise direction is disposed higher, and the edge 1432 disposed on the second side thereof in a counterclockwise direction is disposed lower.

With respect to two adjacent lower vanes 1430, a second discharge area 1435 may be formed between the edge 1431 on the first side of the two adjacent lower vanes 1430 and the edge 1432 on the second side thereof. The second discharge area 1435 may be formed between each of two adjacent lower vanes 1430. Air may be discharged through the second discharge area 1435. The two adjacent lower vanes 1430 may guide the air to the second discharge area 1435. In this embodiment, the second discharge area 1435 has a width which is smaller at a portion in contact with the lower inner frame 1442, and which is larger at a portion in contact with the lower outer frame 1444.

The second discharge area 1435 may be disposed outside of the lower inner frame 1442 and radially disposed with respect to the lower inner frame 1442. More particularly, a plurality of second discharge areas 1435 may be arranged in a circumferential direction of the lower inner frame 1442. The plurality of second discharge areas 1435 may be disposed to be directed toward the center of the lower grill 1440.

Further, air may be discharged in a direction of inclination of two adjacent lower vanes 1430. The plurality of lower vanes 1430 may be arranged in a clockwise direction, such that the air passing through the lower grill 1440 is radially discharged, while generating a spiral air flow in an upwardly inclined direction.

The upper vanes 1410 and the lower vanes 1430 may be inclined in opposite directions. That is, the edge 1411 on the first side of the upper vanes 1410 in a clockwise direction may be disposed at a higher position, and the edge 1431 on the second side of the lower vanes 1430 may be disposed at a lower position.

Further, the lower vanes 1430 may be disposed below the first discharge area 1415 and overlap to cover the first discharge area 1415. When viewed from the top, the lower vanes 1430 cover the first discharge area 1415. The lower vanes 1430 may be wider in width than the first discharge area 1415. When viewed from the top, the lower vanes 1430 may be exposed through the first discharge area 1415, and the second discharge area 1435 not exposed.

In this arrangement, the droplets scattered from the water tank 300 may not directly pass through the second discharge area 1435 and the first discharge area 1415. Even if the scattered droplets pass through the second discharge area 1435, the droplets collide with the upper vanes 1410.

Further, the upper vanes 1410 may be disposed over the second discharge area 1435. The upper vanes 1410 may be disposed over the second discharge area 1435 and overlap to cover the second discharge area 1435. When viewed from the top, the upper vanes 1410 cover the second discharge area 1435. The upper vanes 1410 may be wider in width than the second discharge area 1435.

In the discharge grill 1400 according to this embodiment, the upper vanes 1410 and the lower vanes 1430 are disposed in a vertical direction when viewed from the top, so as to prevent the droplets from being scattered directly to the grill discharge port 231. Further, a user may supply water through the operation water supply port 241 formed at the top cover assembly 230. Furthermore, the water supply cap 430 may be exposed through the operation water supply port 241.

Air inside of the water tank 300 may pass through the first discharge area 1415 and the second discharge area 1435 which are disposed outside of the inner frames 1422 and 1442 of the discharge grill 1400. Water supplied from above may flow into the water tank 300 through the upper grill water supply port 1421 and the lower grill water supply port 1441 which are disposed inside of the inner frames 1422 and 1442 of the discharge grill 1400.

The first discharge area 1415 and the second discharge area 1435 of the discharge grill 1400 may provide the discharge passage 107, and the upper grill water supply port 421 and the lower grill water supply port 1441 may provide the water supply passage 109. The lower grill 1440 may further include a reservoir base 442 that protrudes from the lower inner frame 1442 toward the lower grill water supply port 1441.

The reservoir base 442 may be disposed horizontal and formed in a ring shape when viewed from the top. The water supply cap 430 may be assembled to the reservoir base 442 and disposed at an upper side of the reservoir base 442.

A water supply reservoir 441 may be formed between an outside of the water supply cap 430 and the inner frames 1422 and 1442. The water supply reservoir 441 may serve to temporarily store the water supplied from above, and is a space surrounded by the water supply cap 430, the reservoir base 442, and the inner frames 1422 and 1442.

The reservoir base 442 may have a water supply port 425 that passes through the reservoir base 442 in a vertical direction. The water stored in the water supply reservoir 441 may drop into the water tank 300 through the water supply port 425.

If an amount of the supplied water exceeds a capacity of the water supply reservoir 441, the water may overflow out of the inner frames 1422 and 1442 and may drop into the water tank 300 through the first discharge area 1415 and the second discharge area 1435. The water supplied from above (water dropping through the water supply port) may fall down to a top surface of the humidification housing 800, and when the humidification housing 800 rotates, the water may be scattered to the inner surface of the visual body 210 by the watering housing 800.

When supplying water from above, a user may immediately check a rising level of water through the water level display unit 247. By checking the water level while supplying water from above, the user may adjust an amount of water supplied from above.

Figure 16:
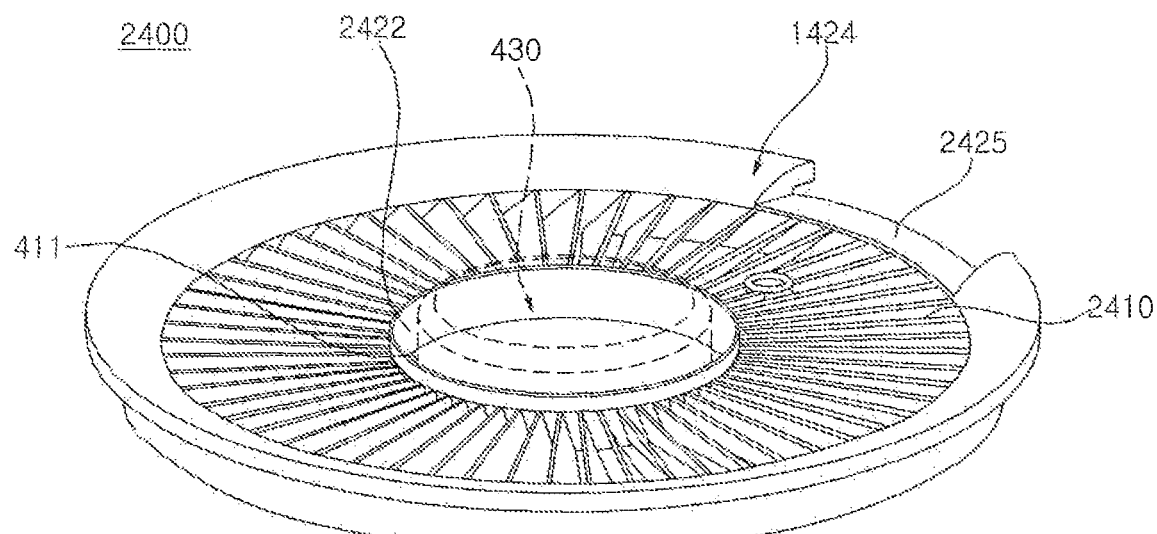
FIG. 16 is a perspective view of a discharge grill according to another embodiment.
Figure 17:
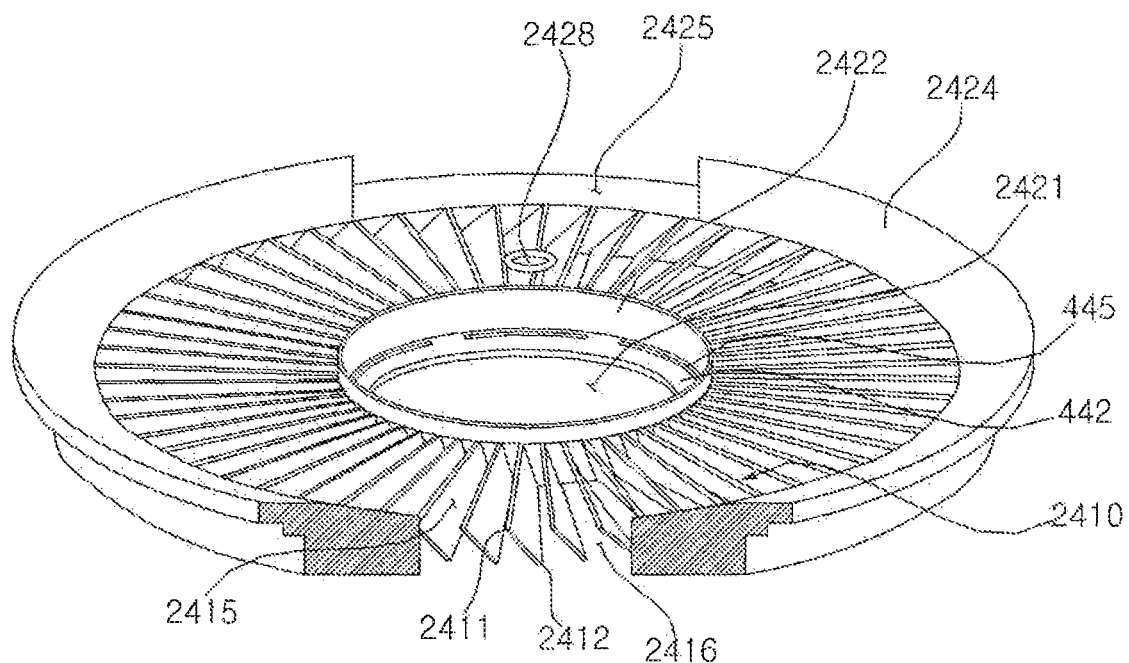
FIG. 17 is a partial cross-sectional perspective view of the discharge grill of FIG. 16.
Figure 18:
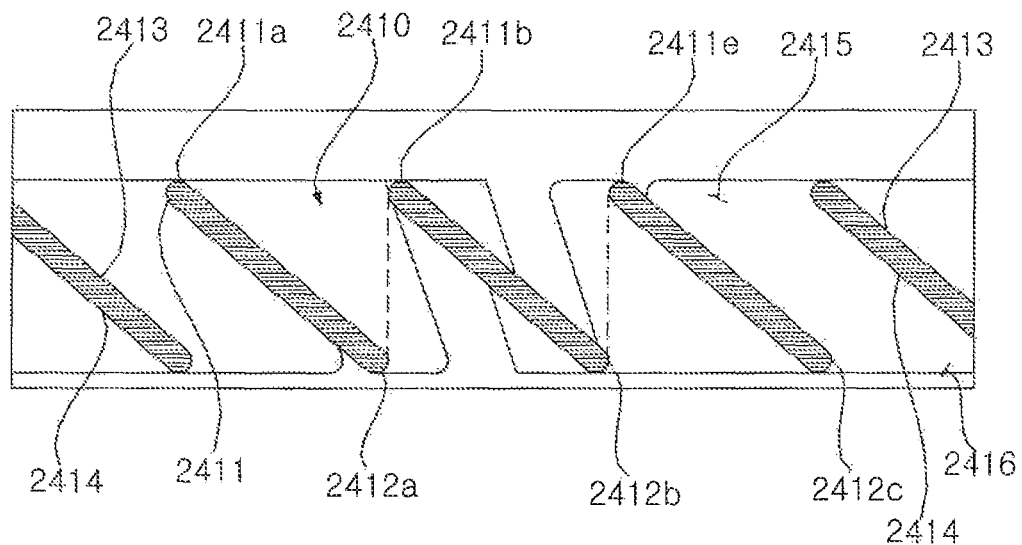
FIG. 18 is a perspective view of discharge vanes of FIG. 17.

FIG. 16 is a perspective view of a discharge grill according to another embodiment. FIG. 17 is a partial cross-sectional perspective view of the discharge grill of FIG. 16. FIG. 18 is a perspective view of discharge vanes of FIG. 17.

Referring to FIGS. 16 to 18, discharge grill 2400 according to this embodiment will be described hereinafter. While the discharge grill 1400 according to the previous embodiment has two vanes which are vertically arranged in a staggered manner, the discharge grill 2400 according to this embodiment covers the grill discharge port 231 using only vanes in a first layer.

The discharge grill 2400 may include an inner frame 2422 having a grill water supply port 2421 formed at a center thereof; an outer frame 2424 formed to surround the inner frame 2422; and a plurality of vanes 2410 that connects the inner frame 2422 and the outer frame 242. The outer frame 2424 may include a holder 2425 on which the top connector 270 may be placed, and the holder 2425 may have a same structure as that of the previous embodiment.

A sensor 2428 may be disposed toward the center from the holder 2425. A position of the sensor 2428 may be the same as that of the previous embodiment, but the sensor 2428 is disposed between the vanes 2410.

The vanes 2410 may be inclined in a clockwise or counterclockwise direction. The vanes 2410 may be inclined with an upper end of the vanes 2410 being directed toward a clockwise direction, and a lower end of the vanes 2410 being directed toward a counterclockwise direction. When viewed from the top, the plurality of vanes 2410 may be inclined in a clockwise direction.

For convenience of explanation, with respect to any one of the plurality of vanes 2410, a vane disposed in a clockwise direction may be defined as a first vane, a vane disposed in a counterclockwise direction may be defined as a third vane, and a vane disposed therebetween may be defined as a second vane. An area between the upper end of two vanes may be defined as a first discharge area 2415, and an area between the lower end of two vanes may be defined as a second discharge area 2416.

When viewed from the top, an upper end 2411b of the second vane may overlap a lower end 2412a of the first vane, and a lower end 2412b of the second vane may overlap an upper end 2412c of the third vane. Accordingly, when viewed from the top, only an inclined upper surface 2413 of the vane 2410 is exposed through the first discharge area 2415, and the inside of the water tank 300 is not directly exposed. When viewed from the bottom, only an inclined lower surface 2414 of the vane 2410 is exposed through the second discharge area 2416.

The structure according to this embodiment has an effect of reducing a thickness of the discharge grill of the previous embodiment which is manufactured in two layers. Further, as the structure includes only the vanes of the first layer, the entire discharge grill 2400 may be integrally formed by injection molding.

The edges on one side and the other side of the vanes overlap adjacent vanes, such that during injection molding, the mold may not be lifted vertically and should be moved in an inclined direction, thereby complicating an operation structure of the mold.

Other components of this embodiment may be the same as those of the previous embodiment, and thus, detailed description thereof has been omitted.

Figure 19:
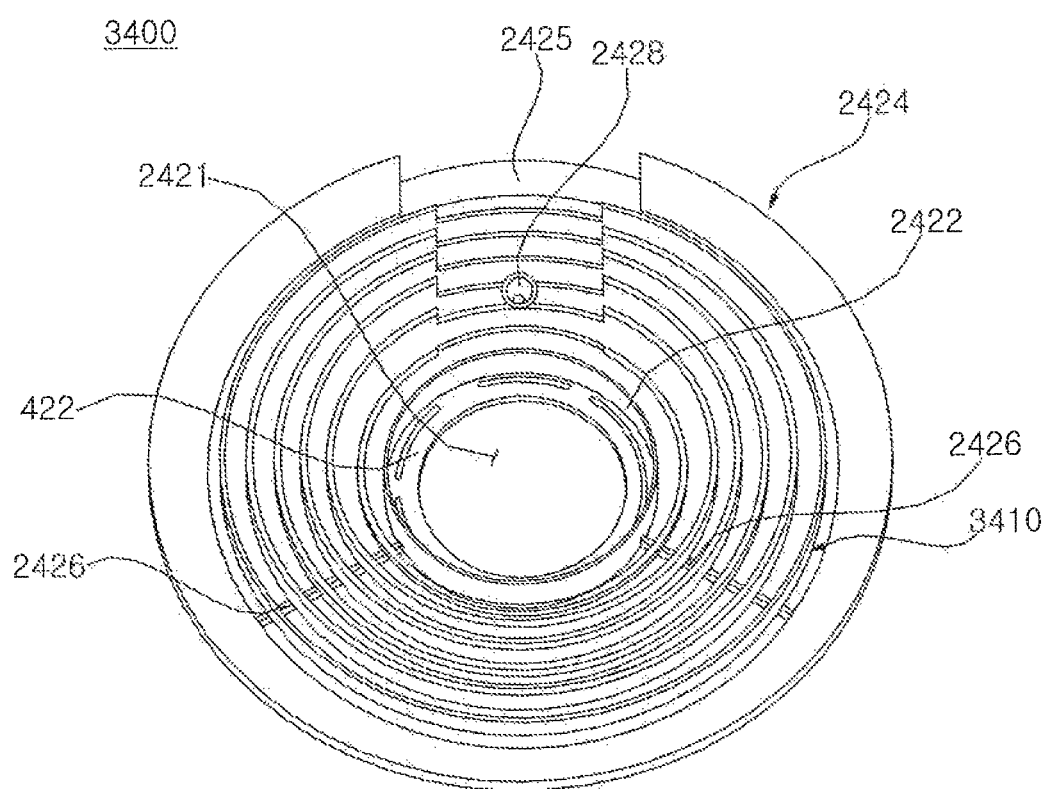
FIG. 19 is a perspective view of a discharge grill according to another embodiment.
Figure 20:
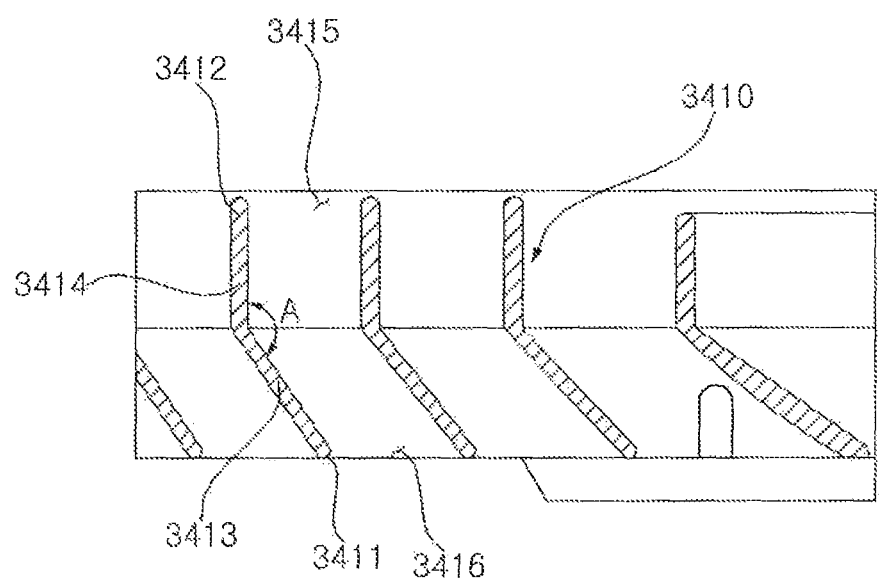
FIG. 20 is a partial front cross-sectional view of the discharge grill of FIG. 19.

FIG. 19 is a perspective view of a discharge grill according to yet another embodiment. FIG. 20 is a partial front cross-sectional view of the discharge grill of FIG. 19.

Referring to FIGS. 19 and 20, unlike the previous embodiment, discharge grill 3400 according to this embodiment has vanes 3410 formed in a ring shape surrounding the inner frame 2422. The plurality of vanes 3410 may have a diameter which increases toward the outer frame 2424. The respective vanes 3410 form a concentric circle around a center, and a diameter of the concentric circle increases toward the outer side of the vanes 3410.

The discharge grill 3400 may include an inner frame 2422 having a grill water supply port 2421 formed at a center thereof; an outer frame 2424 formed to surround the inner frame 2422; a connection frame 2425 that connects the inner frame 2422 and the outer frame 2424; and the plurality of vanes 3410 disposed between the inner frame 2422 and the outer frame 2424 and formed to surround the inner frame 2422. When viewed from the top, the vanes 3410 are formed in a ring shape. A diameter of the vanes 3410 adjacent to the inner frame 2422 may be smaller than a diameter of the vanes 3410 adjacent to the outer frame 2424. The connection frame 3426 may connect the inner frame 2422 and the outer frame 2424, and the plurality of vanes 3410 may be coupled to the connection frame 3426.

The connection frame 3426 may be coupled to a lower end of the vanes 3410. The connection frame 3426 may extend outwardly in a radial direction from the center of the discharge grill 3400, and be radially disposed. In this embodiment, three connection frames 3426 are disposed at an angular interval of 120 degrees; however, the number of the connection frame 3426 is not limited thereto.

The vanes 3410 may have a first inclined portion 3413, inclined with respect to a vertical direction, and a second inclined portion 3414 inclined more steeply in a vertical direction than the first inclined portion 3414. The first inclined portion 3413 and the second inclined portion 3414 may be formed as a flat plate or a curved surface. An included angle A between the first inclined portion 3413 and the second inclined portion 3414 may be greater than 90 degrees and less than 180 degrees.

The second inclined portion 3414 may be inclined more steeply than the first inclined portion 3413 in a vertical direction. The second inclined portion 3414 may be disposed above the first inclined portion 3413. A lower end 3411 of the first inclined portion 3413 may be coupled to the connection frame 3425.

The lower end 3411 of the first inclined portion 3413 may be disposed toward the humidification housing 800. The second inclined portion 3414 may be disposed vertically. An upper end 3412 of the second inclined portion 3414 may be disposed upward.

An area between upper ends 3412 of two vanes may be defined as a first discharge area 3415, and an area between lower ends 3411 of two vanes may be defined as a second discharge area 3416. The first discharge area 3415 may be disposed between the second inclined portions 3414. The second discharge area 3416 may be disposed between the first inclined portions 3413.

Other components of this embodiment may be the same as those of the previous embodiment, and thus, detailed description thereof has been omitted.

Figure 21:
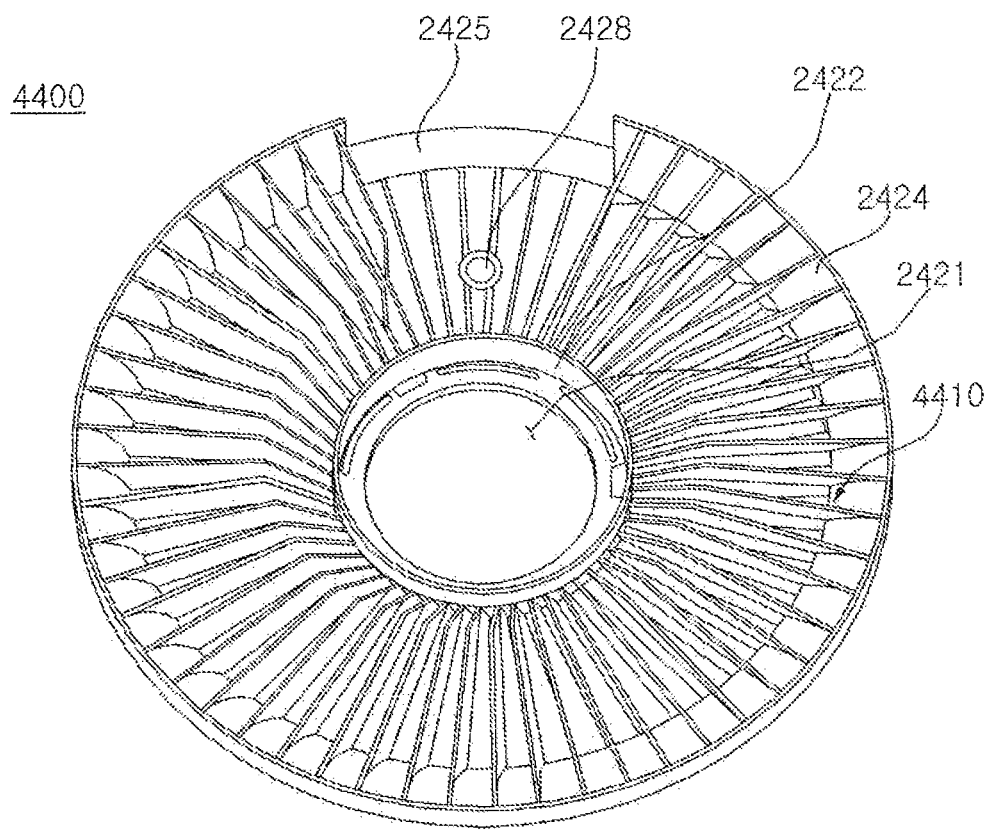
FIG. 21 is a perspective view of a discharge grill according to yet another embodiment.
Figure 22:
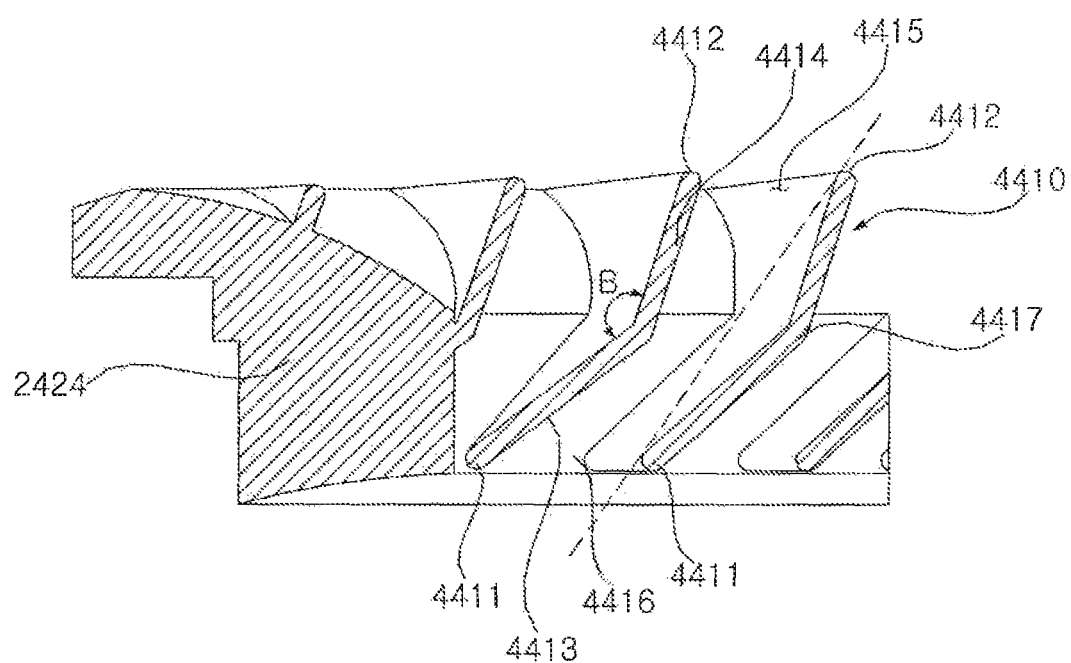
FIG. 22 is a partial front cross-sectional view of the discharge grill of FIG. 21.

FIG. 21 is a perspective view of a discharge grill according to still another embodiment. FIG. 22 is a partial front cross-sectional view of the discharge grill of FIG. 21.

Referring to FIGS. 21 and 22, discharge grill 4400 according to this embodiment may have a plurality of vanes 4410 disposed radially as illustrated in the embodiment of FIG. 16, and the respective vanes 4410 may have a first inclined portion 4413 and a second inclined portion 4414. The vanes 4410 have the first inclined portion 4413, inclined with respect to a vertical direction, and the second inclined portion 4414 extending vertically from the first inclined portion 4413 and inclined more steeply in a vertical direction than the first inclined portion 4413.

The first inclined portion 4413 and the second inclined portion 4414 may be formed as a flat plate or a curved surface. An included angle A between the first inclined portion 4413 and the second inclined portion 4414 may be greater than 90 degrees and less than 180 degrees.

An area between upper ends 4412 of two vanes may be defined as a first discharge area 4415, and an area between lower ends 4411 of two vanes may be defined as a second discharge area 4416. The first discharge area 4415 may be disposed between the second inclined portions 4414. The second discharge area 4416 may be disposed between the first inclined portions 4413.

A portion, at which the first inclined portion 4413 and the second inclined portion 4414 meet each other, may be defined as a bending portion 4417. The bending portion 4417 may be disposed below a virtual line that connects the upper end 4412 and the lower end 4411 of the respective vanes 4410.

If the vanes 4410 are formed as illustrated in this embodiment, discharged air may be diffused spirally. The discharged air may be guided through the second portion 4414, thereby enhancing an upward flow of the air.

Other components of this embodiment may be the same as those of the embodiment of FIG. 16, and thus, detailed description thereof has been omitted.

Figure 23:
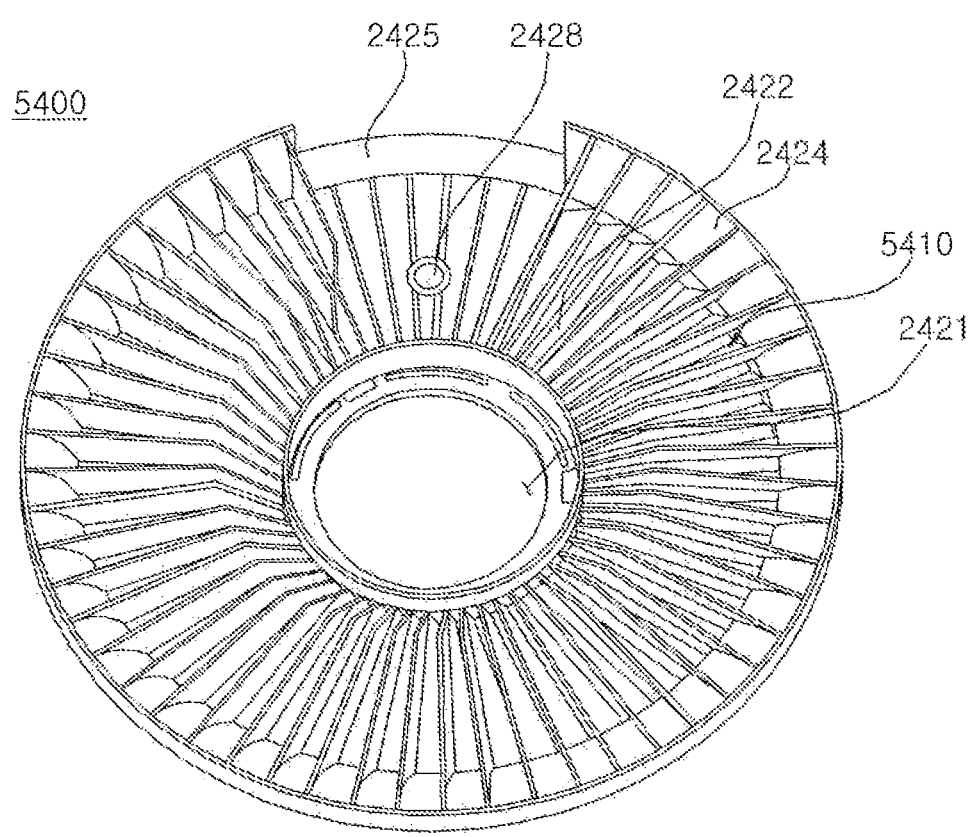
FIG. 23 is a perspective view of a discharge grill according to still another embodiment.
Figure 24:
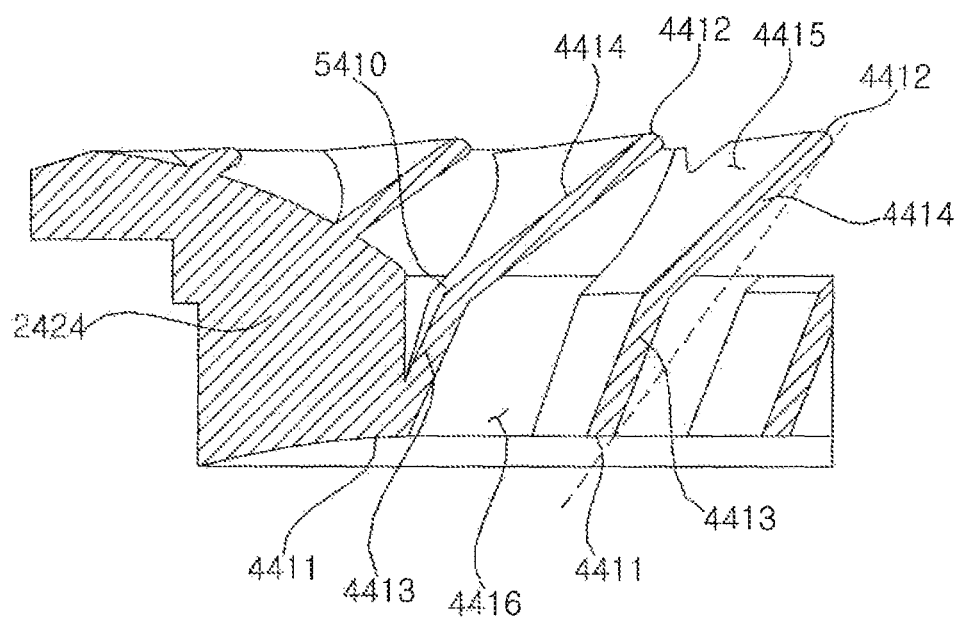
FIG. 24 is a partial front cross-sectional view of the discharge grill of FIG. 23.

FIG. 23 is a perspective view of a discharge grill according to yet another embodiment. FIG. 24 is a partial front cross-sectional view of FIG. 23.

Compared to the discharge grill 4400 of the previous embodiment, a discharge grill 5400 according to this embodiment has a bending portion 5417 disposed above a virtual line. Other components of this embodiment may be the same as those of the previous embodiment, and thus, detailed description thereof has been omitted.

Figure 25:
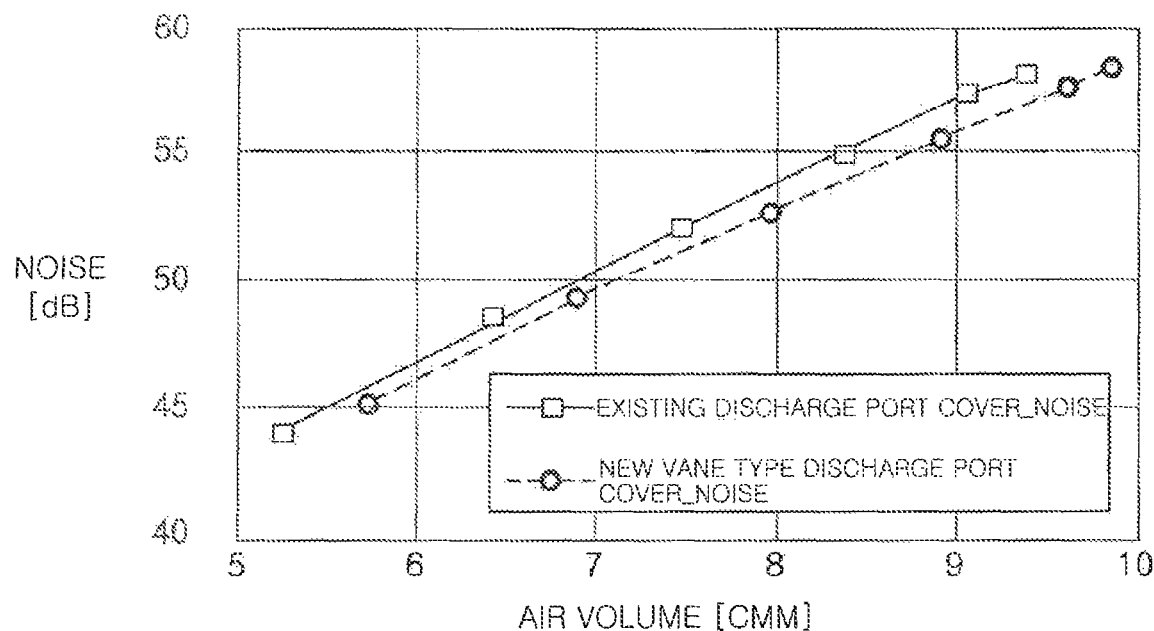
FIG. 25 is diagram illustrating a graph for comparing an air volume and noise between a humidification and air cleaning apparatus according to the embodiment and a general air purifier.
Figure 26:
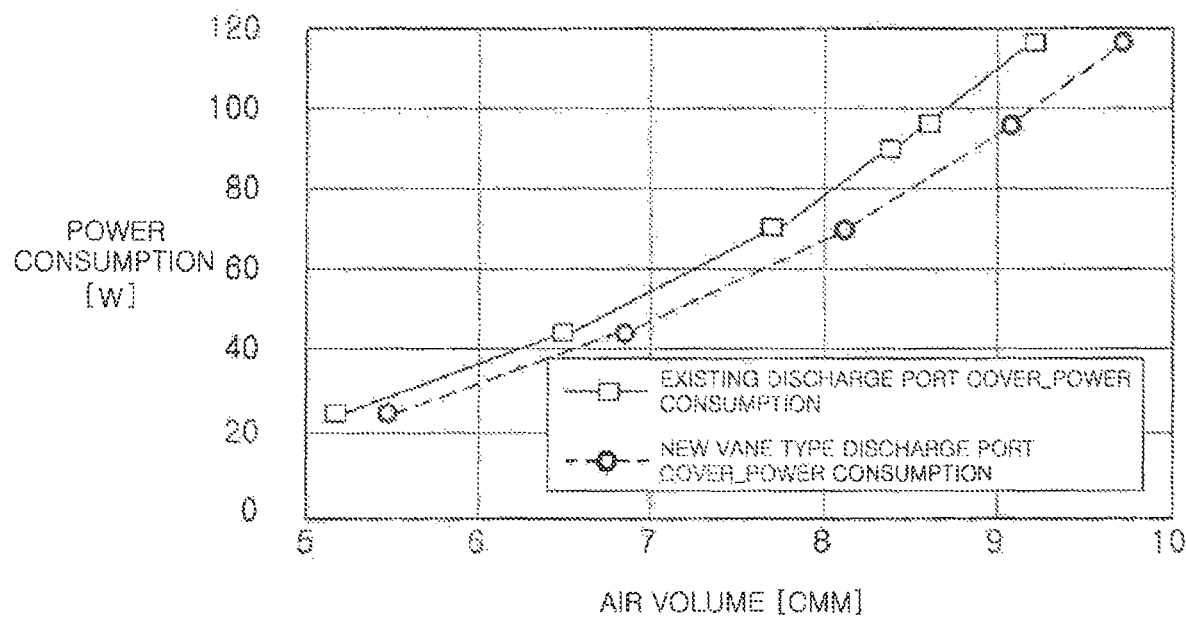
FIG. 26 is diagram illustrating a graph for comparing an air volume and power consumption between a humidification and air cleaning apparatus according to the embodiment and a general air purifier.

FIG. 25 is diagram illustrating a graph for comparing an air volume and noise between a humidification and air cleaning apparatus according to an embodiment and a general air purifier. FIG. 26 is diagram illustrating a graph for comparing an air volume and power consumption between a humidification and air cleaning apparatus according to an embodiment and a general air purifier.

Referring to FIG. 25, it can be seen that under the same air volume condition, discharge grill 1400 according to an embodiment generates a lower level of noise, compared to structure disclosed in Korean Laid-Open Patent Publication No. 10-2017-0051233. In the structure of the related art document, a large amount of noise is generated as a discharge humidification medium comes into contact with discharged air. However, the discharge grill 1400 provides an open discharge area for each of the upper grill and the lower grill, thereby minimizing friction noise. Further, the discharge grill 1400 has low friction with the discharged air, thereby providing the same air volume with less power consumption compared to prior art 1.

Embodiments disclosed herein provide a humidification and air cleaning apparatus capable of minimizing scattering of droplets to an indoor space through a discharge port while minimizing resistance of discharged air. Embodiments disclosed herein further provide a humidification and air cleaning apparatus capable of providing a larger air volume while minimizing scattering of droplets. Embodiments disclosed herein furthermore provide a humidification and air cleaning apparatus capable of providing the same air volume with less power consumption, while minimizing scattering of droplets.

Embodiments disclosed herein provide a humidification and air cleaning apparatus having vanes which may minimize resistance of discharged air and scattering of droplets to an indoor space. Embodiments disclosed herein also provide a humidification and air cleaning apparatus having vanes which may cover the entire discharge port. Embodiments disclosed herein additionally provide a shape and arrangement of vanes for minimizing scattering of droplets.

Embodiments disclosed herein are not limited to the aforementioned advantages and other advantages not described herein will be clearly understood by those skilled in the art from the description.

In embodiments disclosed herein, the edge of a vane overlaps the edge of an adjacent vane, thereby minimizing scattering of droplets to the indoor space while minimizing resistance of the discharged air. The upper vanes of the upper grill cover the top of the discharge area of the lower grill, thereby minimizing scattering of droplets to the indoor space while minimizing resistance of the discharged air. The upper vanes and the lower vanes may be arranged in a zigzag pattern in a vertical direction, thereby minimizing scattering of droplets along with the air to the indoor space. When viewed from the top, the upper vanes and the lower vanes may overlap each other, thereby covering the entire discharge port disposed at the upper side of the water tank.

Embodiments disclosed herein provide a humidification and air cleaning apparatus that may include a water tank having a discharge port which is open toward an upper side, and a discharge grill disposed at the water tank and covering the discharge port. The discharge grill may have a plurality of vanes disposed at the discharge port and spaced apart from each other, and when viewed from a top, overlap each other to cover the discharge port.

The discharge grill may include a lower grill disposed inside of the water tank and covering the discharge port, and an upper grill disposed above the lower grill. The upper grill may have a plurality of upper vanes forming first discharge areas; the lower grill may have a plurality of lower vanes forming second discharge areas; and the upper vanes may be disposed over the second discharge area, and when viewed from the top, cover the second discharge areas. The lower vanes may be disposed below the first discharge areas, and when viewed from the top, may cover the first discharge areas.

At least either the lower vanes or the upper vanes may be inclined with respect to a vertical direction. A direction of inclination of the lower vanes may intersect a direction of inclination of the upper vanes.

The plurality of upper vanes may be disposed radially with respect to a center of the upper grill, and the plurality of lower vanes may be disposed radially with respect to a center of the lower grill. The plurality of upper vanes may be arranged in a circumferential direction with respect to the center of the upper grill, and the plurality of lower vanes may be arranged in a circumferential direction with respect to the center of the lower grill.

The upper grill may include an upper inner frame having an upper grill water supply port formed at a center thereof; an upper outer frame being spaced apart from the upper inner frame and formed to surround the upper inner frame; the plurality of upper vanes which connects the upper inner frame and the upper outer frame; and second discharge areas formed between the plurality of upper vanes. The center of the upper grill may be formed inside of the upper inner frame. The plurality of upper vanes and the second discharge areas may be disposed radially with respect to the center of the upper grill.

The lower grill may include a lower inner frame having a lower grill water supply port formed at a center thereof; a lower outer frame being spaced apart from the lower inner frame and formed to surround the lower inner frame; the plurality of lower vanes connecting the lower inner frame and the lower outer frame; and the first discharge areas formed between the plurality of lower vanes.

A center of the lower grill may be formed inside of the lower inner frame. The plurality of lower vanes and the first discharge areas may be disposed radially with respect to the center of the lower grill.

The plurality of upper vanes may be disposed over the second discharge areas, and the plurality of lower vanes may be disposed below the first discharge areas. When viewed from top, the plurality of upper vanes may cover the second discharge areas.

The discharge grill may be detachably placed at the water tank. The humidification and air cleaning apparatus may further include a top cover assembly configured to receive an operation signal from a user. The top cover assembly may be detachably placed over the discharge grill and may be spaced apart from the plurality of upper vanes.

The humidification and air cleaning apparatus may further include a holder, which is formed at the upper outer frame and on which the top cover assembly is placed. The holder and the upper outer frame may form an installation groove, and the top cover assembly seated in the installation groove may be engaged with the upper outer frame in a horizontal direction.

The top cover assembly may further have an operation water supply port through which water supplied from above may pass. The upper grill water supply port may be disposed below the operation water supply port, and the lower grill water supply port may be disposed below the upper grill water supply port.

The discharge grill may include an inner frame having a grill water supply port formed thereinside; an outer frame being spaced apart from the inner frame and formed to surround the inner frame; the plurality of vanes connecting the inner frame and the outer frame; and discharge areas formed between the plurality of vanes. The plurality of vanes may be inclined with respect to a vertical direction, and when viewed from top, an upper end of any one of the vanes may overlap a lower end of an adjacent vane.

The discharge grill may include an inner frame having a grill water supply port formed thereinside; an outer frame being spaced apart from the inner frame and formed to surround the inner frame; a connection frame that connects the inner frame and the outer frame; the plurality of vanes disposed between the inner frame and the outer frame and formed to surround the inner frame; and discharge areas formed between the plurality of vanes. When viewed from the top, the respective vanes may form a concentric circle.

The humidification and air cleaning apparatus according to embodiments disclosed herein may have one or more of the following advantages.

Firstly, in embodiments disclosed herein the edge of a vane overlaps the edge of an adjacent vane, thereby minimizing scattering of droplets to the indoor space while minimizing resistance of the discharged air. Secondly, the upper vanes of the upper grill cover the top side of the discharge area of the lower grill, thereby minimizing scattering of droplets to the indoor space while minimizing resistance of the discharged air. Thirdly, the upper vanes and the lower vanes may be arranged in a zigzag pattern in a vertical direction, thereby minimizing scattering of droplets along with the air to the indoor space.

Fourthly, when viewed from the top, the upper vanes and the lower vanes overlap each other, thereby covering the entire discharge port disposed at the upper side of the water tank. Fifthly, an included angle is formed between the first inclined portion and the second inclined portion of the vanes, such that an air passage may be bent, thereby preventing the scattered droplets from directly passing through the discharge grill.

Sixthly, in the discharge grill according to embodiments disclosed herein, an open discharge area may be formed at each of the upper grill and the lower grill, thereby minimizing friction noise resulting from friction with air. Seventhly, the discharge grill according to embodiments disclosed herein has low friction with the discharged air, thereby providing the same air volume with less power consumption.

Although embodiments have been disclosed with reference to the illustrated drawings, those skilled in the art will appreciate that embodiments are not limited to those exemplary embodiments and various modifications, additions and substitutions are possible, without departing from the scope and spirit as disclosed in the accompanying claims. Such modifications should not be individually understood from the technical spirit or prospect.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A humidification and air cleaning apparatus, comprising:
    a water tank having a discharge port which is open toward an upper side; and
    a discharge grill disposed on the water tank and covering the discharge port, wherein the discharge grill includes a plurality of vanes which is disposed in the discharge port and spaced apart from each other, and when viewed from a top, overlaps each other to cover the discharge port, wherein the discharge grill comprises a lower grill disposed inside of the water tank and covering the discharge port, and an upper grill disposed above the lower grill, wherein the upper grill has a plurality of upper vanes forming first discharge areas; the lower grill has a plurality of lower vanes forming second discharge areas; and the plurality of upper vanes is disposed over the second discharge areas, and when viewed from the top, covers the second discharge areas, and wherein at least either the plurality of lower vanes or the plurality of upper vanes is inclined with respect to a vertical direction.

2. The apparatus of claim 1, wherein the plurality of lower vanes is disposed below the first discharge areas, and when viewed from the top, covers the first discharge areas.

3. The apparatus of claim 1, wherein a direction of inclination of the plurality of lower vanes intersects a direction of inclination of the plurality of upper vanes.

4. The apparatus of claim 1, wherein the plurality of upper vanes is disposed radially with respect to a center of the upper grill, and the plurality of lower vanes is disposed radially with respect to a center of the lower grill.

5. The apparatus of claim 4, wherein the plurality of upper vanes is arranged in a circumferential direction with respect to the center of the upper grill; and the plurality of lower vanes is arranged in a circumferential direction with respect to the center of the lower grill.

6. The apparatus of claim 1, wherein the upper grill comprises:
    an upper inner frame having an upper grill water supply port formed at a center thereof;
    an upper outer frame spaced apart from the upper inner frame and surrounding the upper inner frame;
    the plurality of upper vanes which connects the upper inner frame and the upper outer frame; and
    the second discharge areas which are formed between the plurality of upper vanes.

7. The apparatus of claim 6, wherein the center of the upper grill is formed inside of the upper inner frame, and wherein the plurality of upper vanes and the second discharge areas are disposed radially with respect to the center of the upper grill.

8. The apparatus of claim 1, wherein the discharge grill is detachably placed in the water tank.

9. The apparatus of claim 1, wherein the discharge grill comprises:
    an inner frame having a grill water supply port formed thereinside;
    an outer frame spaced apart from the inner frame and surrounding the inner frame;
    the plurality of vanes which connects the inner frame and the outer frame; and
    discharge areas formed between the plurality of vanes.

10. The apparatus of claim 9, wherein the plurality of vanes is inclined with respect to a vertical direction, and when viewed from the top, an upper end of any one of the plurality of vanes overlaps a lower end of an adjacent vane.

11. The apparatus of claim 1, wherein the discharge grill comprises:
an inner frame having a grill water supply port formed thereinside;
an outer frame being spaced apart from the inner frame and surrounding the inner frame;
a connection frame that connects the inner frame and the outer frame;
the plurality of vanes disposed between the inner frame and the outer frame and surrounding the inner frame; and
discharge areas formed between the plurality of vanes.

12. The apparatus of claim 11, wherein when viewed from the top, the plurality of vanes form a concentric circle.

13. A humidification and air cleaning apparatus, comprising:
a water tank having a discharge port which is open toward an upper side; and
a discharge grill disposed on the water tank and covering the discharge port, wherein the discharge grill includes a plurality of vanes which is disposed in the discharge port and spaced apart from each other, and when viewed from a top, overlaps each other to cover the discharge port, wherein the discharge grill comprises a lower grill disposed inside of the water tank and covering the discharge port, and an upper grill disposed above the lower grill, wherein the upper grill has a plurality of upper vanes forming first discharge areas; the lower grill has a plurality of lower vanes forming second discharge areas; and the plurality of upper vanes is disposed over the second discharge areas, and when viewed from the top, covers the second discharge areas, wherein the upper grill comprises:
an upper inner frame having an upper grill water supply port formed at a center thereof;
an upper outer frame spaced apart from the upper inner frame and surrounding the upper inner frame;
the plurality of upper vanes which connects the upper inner frame and the upper outer frame; and
the second discharge areas which are formed between the plurality of upper vanes, and wherein the lower grill comprises:
a lower inner frame having a lower grill water supply port formed at a center thereof;
a lower outer frame spaced apart from the lower inner frame and surrounding the lower inner frame;
the plurality of lower vanes which connects the lower inner frame and the lower outer frame; and
the first discharge areas formed between the plurality of lower vanes.

14. The apparatus of claim 13, wherein a center of the lower grill is formed inside of the lower inner frame, and wherein the plurality of lower vanes and the first discharge areas are disposed radially with respect to the center of the lower grill.

15. The apparatus of claim 13, wherein the plurality of upper vanes is disposed over the second discharge areas, and the plurality of lower vanes is disposed below the first discharge areas, and wherein when viewed from the top, the plurality of upper vanes covers the second discharge areas.

16. A humidification and air cleaning apparatus, comprising:
a water tank having a discharge port which is open toward an upper side; and
a discharge grill disposed on the water tank and covering the discharge port, wherein the discharge grill includes a plurality of vanes which is disposed in the discharge port and spaced apart from each other, and when viewed from a top, overlaps each other to cover the discharge port, wherein the discharge grill is detachably placed in the water tank; and
a top cover configured to receive an operation signal from a user, wherein the top cover is detachably placed over the discharge grill and is spaced apart from the plurality of upper vanes.

17. The apparatus of claim 16, further comprising a holder, which is formed in the upper outer frame and on which the top cover is placed, wherein the holder and the upper outer frame form an installation groove, and wherein the top cover seated in the installation groove is engaged with the upper outer frame in a horizontal direction.

18. The apparatus of claim 16, wherein the top cover further includes an operation water supply port through which water supplied from above passes, wherein the upper grill water supply port is disposed below the operation water supply port, and the lower grill water supply port is disposed below the upper grill water supply port.

19. A humidification and air cleaning apparatus, comprising:
a water tank having a discharge port which is open toward an upper side; and
a discharge grill disposed on the water tank and covering the discharge port, wherein the discharge grill includes first and second grill frames vertically oriented, the first grill having a plurality of first vanes which is disposed over the discharge port and spaced apart from each other and the second grill frame having a plurality of second vanes which is disposed over the discharge port and spaced apart from each other, and wherein the plurality of first vanes and the plurality of second vanes collectively cover the discharge port when viewed from a top of the humidification and air cleaning apparatus to prevent water droplets from being scattered in a vertical direction through the discharge port.

* * * * *